United States Patent
Smith

(10) Patent No.: US 10,766,709 B2
(45) Date of Patent: Sep. 8, 2020

(54) MODULAR CONVEYANCE SYSTEM

(71) Applicant: CONVEYOR MANUFACTURERS AUSTRALIA PTY LTD., Newcastle, New South Wales (AU)

(72) Inventor: Benjamin John Smith, New South Wales (AU)

(73) Assignee: CONVEYOR MANUFACTURERS AUSTRALIA PTY LTD., Newcastle, New South Wales (AU)

( * ) Notice: Subject to any disclaimer, the term of this patent is extended or adjusted under 35 U.S.C. 154(b) by 0 days.

(21) Appl. No.: 16/484,400

(22) PCT Filed: Feb. 8, 2018

(86) PCT No.: PCT/AU2018/000016
§ 371 (c)(1),
(2) Date: Aug. 7, 2019

(87) PCT Pub. No.: WO2018/145144
PCT Pub. Date: Aug. 16, 2018

(65) Prior Publication Data
US 2020/0031588 A1   Jan. 30, 2020

(30) Foreign Application Priority Data

Feb. 8, 2017 (AU) ................................ 2017900388

(51) Int. Cl.
*B65G 41/00* (2006.01)
*B65D 88/02* (2006.01)
(Continued)

(52) U.S. Cl.
CPC .......... *B65G 41/00* (2013.01); *B65D 88/022* (2013.01); *B65D 88/12* (2013.01); *B65D 88/78* (2013.01);
(Continued)

(58) Field of Classification Search
CPC ...... B65G 21/00; B65G 21/005; B65G 21/08; B65G 21/12; B65G 41/00; B65G 41/002;
(Continued)

(56) References Cited

U.S. PATENT DOCUMENTS 4,345,869 A * 8/1982 King .................. B60P 1/38
414/520
5,895,193 A * 4/1999 Ung ...................... B65D 88/12
198/832.2
(Continued)

FOREIGN PATENT DOCUMENTS

BR   102015001752 A2   4/2016
WO      96/30289 A1   10/1996

OTHER PUBLICATIONS

International Search Report and the Written Opinion for International Application No. PCT/AU2018/000016 dated Feb. 28, 2018, 13 pages.

*Primary Examiner* — Gene O Crawford
*Assistant Examiner* — Keith R Campbell
(74) *Attorney, Agent, or Firm* — Patterson + Sheridan, LLP

(57) ABSTRACT

A conveyance system (10) including: a conveyor having a frame (22) connectable to a drive unit; and a shipping container (12) having a base (16), a top wall (14), two opposing side walls (18) and two opposing end walls (20), wherein the conveyor is fixed within the shipping container (12) in an assembled state.

20 Claims, 28 Drawing Sheets

(51) Int. Cl.
  *B65D 88/12* (2006.01)
  *B65D 88/78* (2006.01)
  *B65G 21/08* (2006.01)
  *B65G 21/12* (2006.01)
  *B65G 21/00* (2006.01)

(52) U.S. Cl.
  CPC ........... *B65G 21/005* (2013.01); *B65G 21/08* (2013.01); *B65G 21/12* (2013.01); *B65G 41/002* (2013.01); *B65G 41/006* (2013.01); *B65G 41/007* (2013.01); *B65G 2207/30* (2013.01)

(58) Field of Classification Search
  CPC ............... B65G 41/006; B65G 41/007; B65G 2207/30; B65D 88/022; B65D 88/12; B65D 88/546; B65D 88/78; B60P 1/36; B60P 1/38
  USPC .............................. 198/860.2, 860.3, 860.4
  See application file for complete search history.

(56) References Cited

U.S. PATENT DOCUMENTS

| | | | | |
|---|---|---|---|---|
| 6,164,229 | A * | 12/2000 | Cavanagh | B65D 90/143 114/61.1 |
| 8,820,559 | B2 * | 9/2014 | Beitler | B65D 88/128 206/512 |
| 8,894,122 | B2 * | 11/2014 | Gilbert | B62D 25/2054 296/24.44 |
| 10,414,320 | B2 * | 9/2019 | Baker | E05D 5/043 |
| 2013/0233755 | A1 * | 9/2013 | Lampe | B65D 88/528 206/524.6 |
| 2013/0343848 | A1 * | 12/2013 | Wangen | B60P 1/38 414/528 |
| 2015/0183587 | A1 * | 7/2015 | Toth | B65G 37/005 198/604 |

* cited by examiner

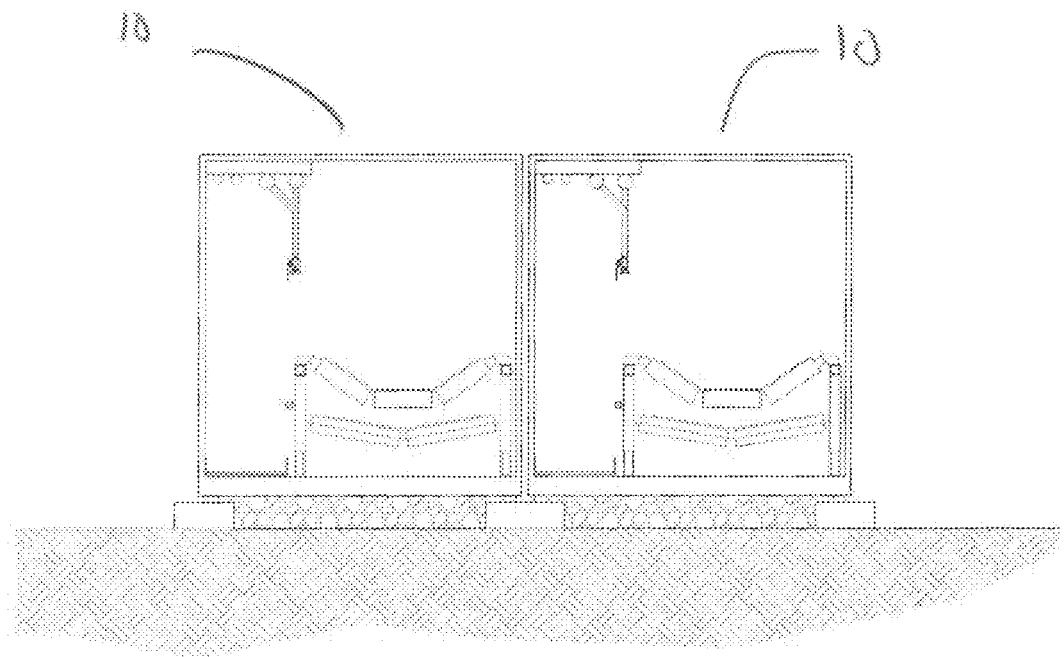
Figure 24
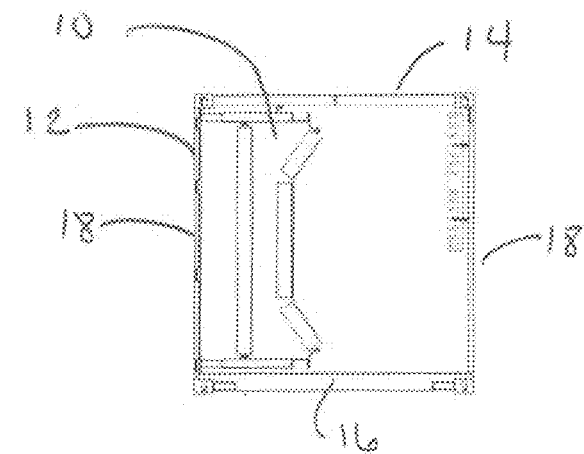
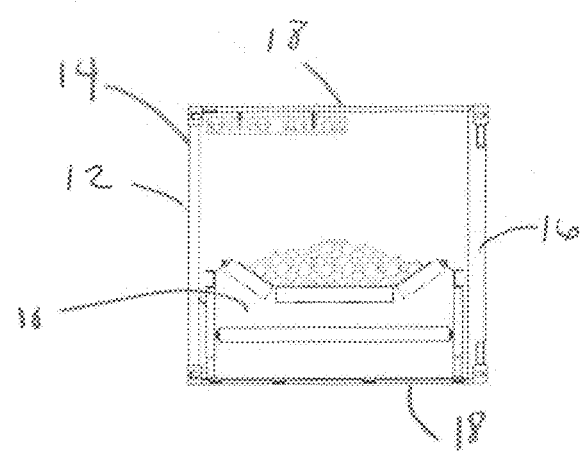
Figure 25

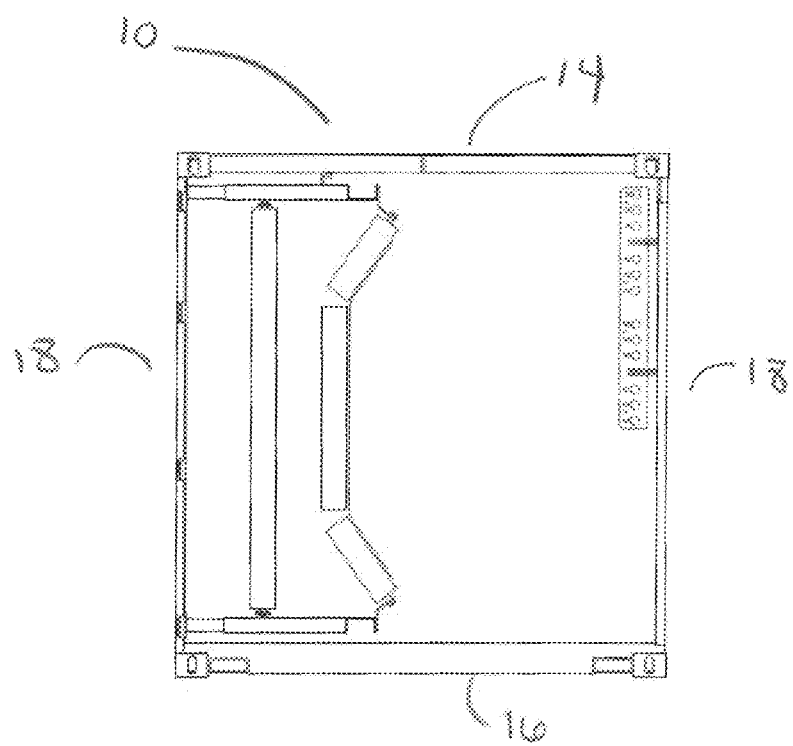
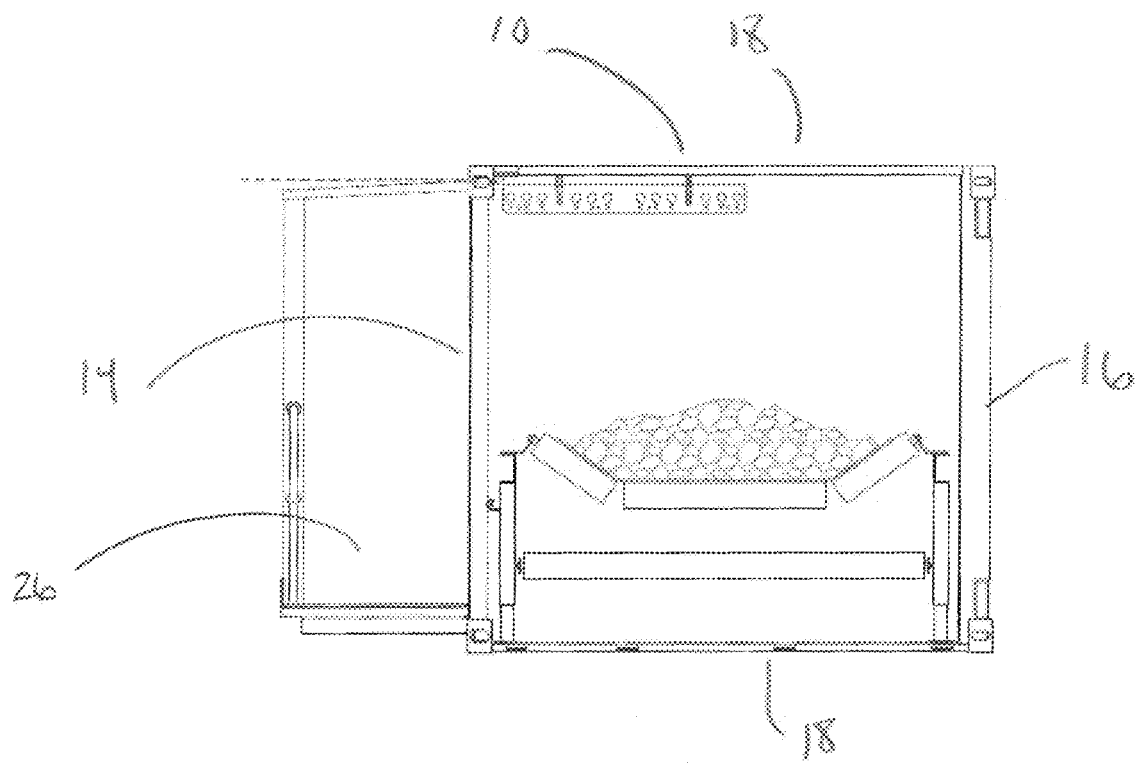
Figure 26

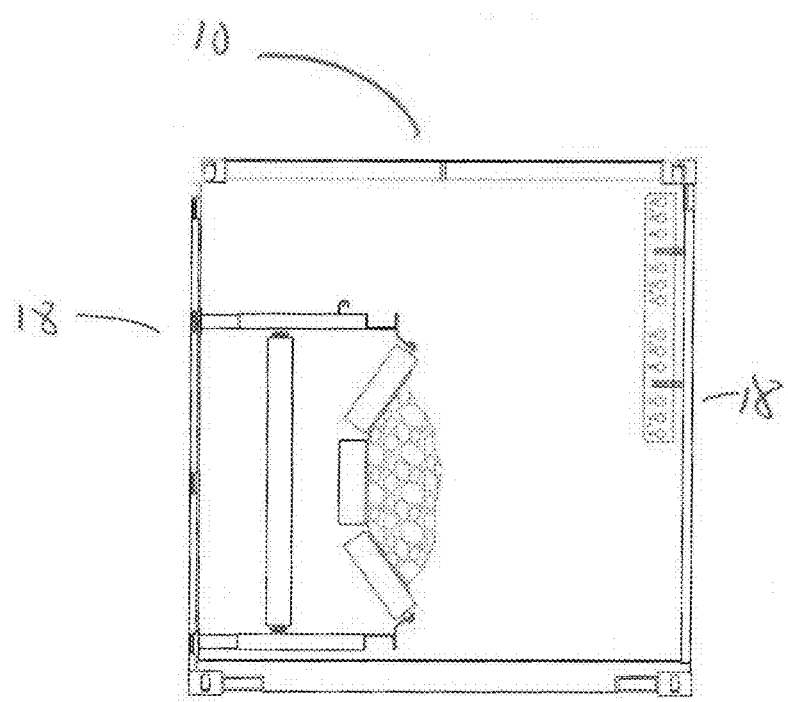
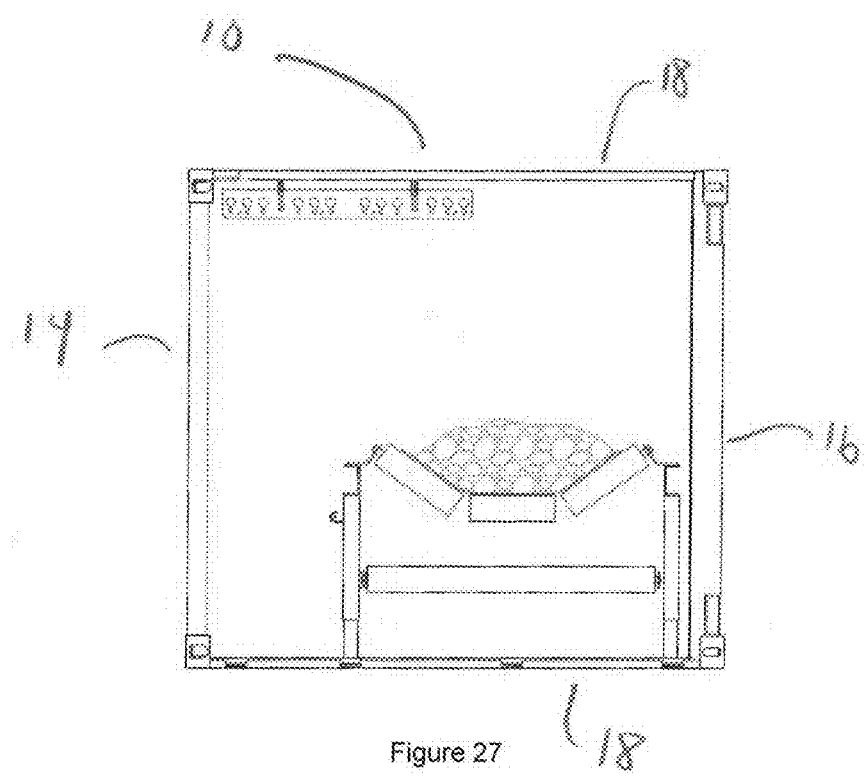
Figure 27

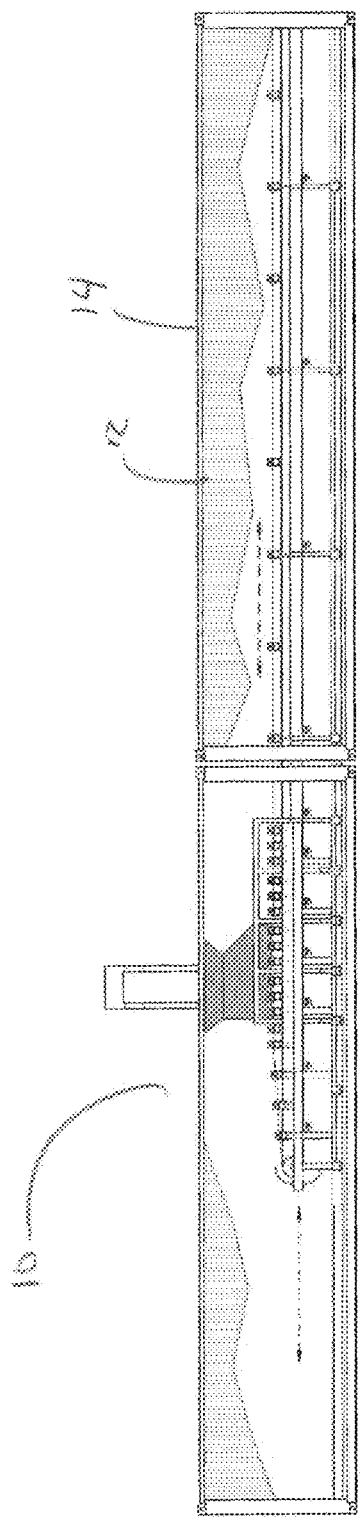
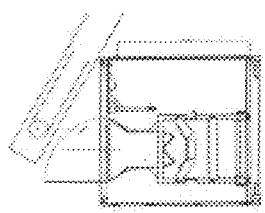
Figure 35

MODULAR CONVEYANCE SYSTEM

FIELD

The present invention relates to a conveyor frame, and in particular, a modular conveyor frame for overland, subsurface and over-water transportation.

BACKGROUND

In the mining, extractive and other industries that produce bulk solids, it is necessary to move large amounts of material over long distances. Overland conveyors provide an effective means for transporting bulk material such as coal, iron ore, stone, sand, woodchips and the like. Typically, the conveyors are installed on site using concrete strip or pier or pile-style footings every 2-3 metres. Conveyors can reach total lengths of up to one hundred kilometres.

The conveyors are required to negotiate various terrain and surface features such as creeks, rivers, estuaries and open water, drainage channels, areas of archaeological and/or cultural sensitivity, variability in terrain and soil types, roads, and other services and infrastructure.

At present the conveyors are constructed on site. Parts are shipped in via train or truck and assembled on site. This is usually carried out manually and involves substantial amounts of manual handling and physical work. The construction is time consuming and costly, particularly in remote areas where personnel must be transported to and from the site and accommodated. Additionally, the conveyors are typically open to air, and are exposed to heat, dust and other weather elements thus causing deterioration of the conveyor structure itself, and also idlers, rubber belting, communications and other services. Additionally, and depending on the material being conveyed, losses may occur due to wind blowing material from the conveyor. This not only leads to a loss of income, but also poses an environmental impact due to contamination of the surrounding landscape.

In colder climates, conveyors are subject to snow loads, ice build-up and the freezing of components. This can lead to premature wear, failure of components and deterioration of the material being conveyed. Colder climates, snow and ice, also can contaminate or adversely affect the product being conveyed. In extreme levels of cold, operation of the conveyor can require special insulation and heating to avoid freezing, which is unsuitable for operation.

Another problem with current conveyors is noise. Many overland conveyors are installed in areas that are within hearing distance of noise receptors. Harmonic noise and vibration can cause noise to be transmitted to nearby noise receptors and can often be the subject of noise complaints owing to the adverse impacts to people's quality of life.

Electro-mechanical drive units provide the required haulage effort to move the belting and load being carried. Powering these drive units is either electrical and/or mechanical power. This usually requires electrical mains to be connected to the driving end of the conveyance, and sometimes along the conveyances length for communications or other subsequent drive units. Often though, conveyors are employed in remote locations, and away from sources of mains electrical power. This requires mains conductors to be installed, sometimes over long distances, to power drive units. In other instances where it is either not possible or feasible to install electrical mains conductors, electrical power is generated on-site using generators fuelled by either diesel, gas or some other combustible fuel source, or combination thereof.

Generally, conveyances can consume significant amounts of electrical and/or mechanical power in order to move the combined mass of belting and/or loads being carried. As such, conveyances can be expensive to operate, owing to the cost of installing and using electrical power.

OBJECT OF THE INVENTION

It is the object of the present invention to substantially overcome or ameliorate one or more of the disadvantages of the prior art, or to at least provide a useful alternative.

SUMMARY OF INVENTION

In one embodiment the present invention provides a modular conveyance system including:
a container having a top, a base, side walls and end walls; and
a conveyor frame housed within the container in an operationally ready state, wherein in a first configuration the side walls and end walls are fixed to form an enclosure around the conveyor frame for transport of the conveyance system, and in a second configuration the end panels are removable to allow extension of the conveyor frame, and at least a portion of one of the side walls is removable to provide access to the conveyor frame during use, so that the container and the conveyor frame are transported and installed as a single unit.

In one embodiment, the removable side wall is pivotably attached at the base and configured to open outwardly until generally parallel with the base to form a platform or walkway.

In another embodiment the removable panel may be slidably attached at or within the base of the container and configured to extend in a parallel manner from within the container to form the platform or walkway. Grating and handrails may be added for additional safety.

In a preferred embodiment, the modular conveyance system includes a plurality of conveyor frames, each frame being housed in its respective container in an operationally ready state, and each modular conveyance system being connectable to an adjacent modular conveyance system to form a continuous run.

In one embodiment, a plurality of conveyor frames may be housed in a single container in an operationally ready state to allow for the transport, installation and use of more than one conveyor line in total. Preferably, the conveyor frames are housed in a vertical configuration. Where operational requirements dictate, conveyor frames may be installed in a side-by-side configuration or a staggered configuration in any plane across and along the length of the container.

The container may be a standard 20 ft (5885 mm) or 40 ft (12,033 mm) shipping container. Alternatively, the container may be of any other suitable size to fit the conveyor frame or application.

Preferably, the modular conveyance systems may be connectable in multiple configurations including a horizontally straight and level configuration suitable for level terrain, a vertical and/or horizontal configuration to negotiate undulating terrain, or a horizontally straight and curved configuration to negotiate turns and the like. For example, a configuration may include successive conveyance systems connected in a straight profile and successive conveyance systems connected to form a curved profile in any plane. It is envisioned that conveyance systems may be connectable along a curved plane in any direction. The conveyance systems may also be connected to span terrain such as water, roads, and the like. In one embodiment, the conveyance systems are connectable via a strengthened interface to accommodate distances greater than the length of one standard shipping container. This allows multiple conveyance systems to be connected to clear one span.

In one embodiment, the container may be installed in a generally horizontal manner such that the roof and floor are parallel or sub-parallel with the ground. In another embodiment, the container may be installed at an angle with respect to horizontal or in any other plane or grade as required of the system. This allows for the contouring of the container and conveyance attached to follow the natural undulations of the ground or other installation requirement.

In another embodiment, the container may be installed in a generally vertical manner such that the roof and floor of the container are vertical and generally perpendicular to the ground or installation surface. This facilitates for the installation of conveyances at a steep gradient, or vertical conveyances.

In one embodiment, the access and platform/walkway may be covered by a roof or similar protective structure. The removable panel may be pivotably attached at the top or upper portion of the container and configured to open outwardly until at an angle or parallel with the base to form a roof or cover. The access means may also include a removable panel slidably attached at or within a top portion of a side panel of the container. The panel being slidable in a parallel manner from within the container to form the roof or cover.

In another embodiment, the access means includes a platform or walkway within the shipping container.

Preferably, the container is fitted with fixtures and features such as chains, hooks, slings, lifting points, fork tine openings and conventional container securing mechanisms to facilitate transport using conventional transport means, such as train or truck, and other equipment suitable to shipping containers.

Preferably, the conveyance system includes all required piped services housed within the container. In one embodiment this may include compressed air lines and/or hoses; fresh, fire and waste-water reticulation pipes and hoses.

Preferably, the conveyance system includes a fire protection system fitted within the container. In one embodiment, this may be a water deluge-type system reticulated through, within or along the container, and to successive containers. In another embodiment, this may be a reticulated gas or other flame suppressant-type mixture, substance or material.

Preferably, the conveyance system includes insulated electrical conductors, cabling and other associated power reticulation devices fitted within, or to, the container.

Preferably, the conveyance system includes communications conductors, cabling, transmitters, receivers and other associated communications devices fitted within, or to, the container.

Preferably, the conveyance system includes lighting systems within the container to illuminate the interior and/or exterior of the container.

Preferably, the container includes attachment means for connecting to an adjacent container to form a continuous conveyor run. The attachment means may include a mounting plate to seal the containers from the outside environment. The attachment means also includes an optional mounting plate to connect two or more successive containers together in order to span a greater distance between successive foundations than the span achieved with a single container. The attachment means may also include provision for the connection between successive containers, of the conveyor frame, itself, any walkway or platform within each container and any services, power, reticulated medium or communications within the container and to and from successive containers.

Preferably, the container is configured to securely attach to ground footings. In one embodiment, ground footings may consist of a concrete footing with appropriate mechanisms to secure the container in place. In another embodiment, the footings may consist of a purely steel structure embedded securely into the ground. In another embodiment, the footings may be of a combination of concrete and steel, or any other material deemed appropriate.

In another embodiment, the conveyance system includes a skid plate for mounting directly onto the ground. The skid plate is formed from a suitable material that allows the container's ground contact foot print to be enlarged or altered than otherwise provided by the ground contact points of the container itself. The skid plate facilitates movement of the conveyance modules along the ground without the need for lifting and transporting by specialised equipment. In another embodiment, the conveyance system may be directly laid upon the ground without the use of specialised footings or ground supports.

In another embodiment, adjustment mechanisms are fitted to the container to independently adjust the height, position or orientation of the container relative to ground. Preferably, the container includes telescopic legs adjustable in length to retract within the container and extend outwardly from the container. Still preferably, the container includes locking or other securing means to secure the legs in a selected position. The locking means can include a bolt, pin, hydraulic, pneumatic, screw or any other suitable mechanism.

In another embodiment, the container is mountable on floating devices for use over-water. This means may include pontoons, catamaran hulls or any other floatation means.

In another embodiment, the container frame is mountable to rails laid on the ground to facilitate movement of the entire container system longitudinally for the adjustment, transport, installation or as the foundation of the container system itself.

In another embodiment, the container is mountable to rail laid on the ground to facilitate movement longitudinally of a single and/or multiple individual containers that make up the overall container system, to facilitate the adjustment, transport, installation or as the foundation of the container system itself.

In another embodiment, the container is mountable to another supporting frame or structure secured in the ground. The frame or structure may be formed of steel, concrete, or other suitable material. The supporting frame is configured to raise the conveyance system above the terrain.

In another embodiment, the container may be fitted with suitable enclosure material or panelling to one or more walls, top, and base in order to protect the conveyor frame from the outside environment. The panelling may include insulation to attenuate noise and vibration and/or control the temperature within the container. The panelling may also include the steel wall material already found in shipping containers.

In another embodiment, the container may include means disposed on or within the container to generate electricity. This means may include solar panelling, other photovoltaic surfaces and devices, wind turbines, or mechanical or electromagnetic devices configured to generate power from the movement of the conveyor or flow of material.

In another embodiment, the container may include means disposed on or within the container, for the conduction of electrical current. This means may include external aerial conductors, internal conductors and/or isolated bus bars, or other means as appropriate.

In another embodiment, the container may include additional structural members configured to support substantial loading, for example due to land and/or backfill material, to enable the conveyor system to be buried or installed in a sub-terrain position. Additionally, additional structural members may be installed for strengthening the container for use in other loading conditions or situation that requires stiffening or strengthening of the container above that normally provided by the container itself. Preferably, the structural members include deterioration control protecting mechanisms to prevent corrosion, rusting or other deformation of members and components. Structural members may include cross-bracing in a vertical, horizontal or other angled configuration and located in any plane within the container.

In another embodiment, the container may be constructed such that it may be installed on the surface and back-filled alongside and over the top of the container for environmental reasons.

In another embodiment, the containers may be fitted with a device or structure, or other system for the transport of a conveyor frame longitudinally along the inside of the container. The device allows the conveyor frame within the container to be moved length-wise within the container and also within adjacent containers for the purpose of lengthening or shortening the overall conveyor length, the installation or removal of the conveyance system from the container, or to temporarily remove a section of the continuous conveyance system. The device facilitates successive containers to be added to the overall conveyance system in order to lengthen the system incrementally and install the actual conveyor at the same time. This means may be by way of overhead monorail, overhead pipe system, or other fixed overhead transport mechanism. This means may also be by way of floor-mounted rails, tracks, rollers or other transport mechanism. This means may also include the entire conveyance system—being the driving end, the receiving end of the conveyance and the run of conveyance in between the two distant points.

In one embodiment, the conveyance system includes an idler changing mechanism fitted within the container to allow idlers to be removed or changed while the conveyor is still in motion. In one embodiment, the idler sets may be lowered away from the belting in a vertical manner. In another embodiment, the idler set may be rotated to a horizontal or other sub-vertical position. In another embodiment, the idler set may then be slidably removed from the conveyance area to facilitate the idlers removal from and subsequent installation upon the conveyance.

In one embodiment, the container may be fitted with a ventilation system to provide fresh air into the container, or vent fouled air from the container. In another embodiment, the container may be fitted with temperature or atmospheric control systems and devices to control the internal environment within the container.

In one embodiment, the container may be stacked more than a single container in height.

In another embodiment, the containers may also be joined laterally, along the longer side, to form more than one conveyor system in a parallel fashion.

In another embodiment, the containers may also be provided with access and egress means vertically or horizontally from the container. This may be by doorway, doors, stairs, ladder, walkway, ramp or other access means.

In another embodiment, if the conveyance required is a larger width and/or depth than a standard container, it may be included in a container that has additional height. In this instance the conveyance may be mounted upon one or more sidewalls, or roof, of the container for transport purposes, and upon installation on site, the container is rotated about its longitudinal axis to the correct operating position. For example, a "high-top" container contains an additional height over a standard shipping container, making the vertical dimension greater than the width. By mounting the conveyance on either or both sidewalls of the high-top container, a wider conveyance may be installed within the container. In this scenario, the high-top container would be transported in its normal upright position, and upon installation, would be rotated along the longitudinal axis placing the conveyance, or conveyances, in the correct horizontal operating position.

In another embodiment, the use of a high-top or otherwise modified container, whereby the sidewalls are utilised for the installation of the conveyance, and is then rotated into the operating position, a walkway and/or roof may be pivotably, or slidably, attached to the container, such that upon installation the walkway and/or roof is in the correct operating position. In this instance, the walkway and/or roof in the transport position is the actual roof and/or floor of the container (in the normal upright position).

In another embodiment, the use of a high-top or otherwise modified container, allows for the installation of additional conveyances and/or walkways within the container.

In another embodiment, there is provided the use of a high-top or otherwise modified container, whereby the sidewalls are utilised for the installation of the conveyance, while the container remains in the upright position upon installation, the sidewalls of the container may pivotably rotate outward to a horizontal position, allowing the correct operating orientation of the conveyance to be achieved.

In another embodiment, the container may contain discreet conveyances, as opposed to units that support an overall conveyance system. In this means, each container is fitted with one or more conveyances that contain a drive mechanism and loading point within each container. In this embodiment, one or more conveyances within a container transfer the load being carried to the next conveyance, or multiple conveyances in the adjoining container, and so on to form an overall flexible conveyance system. In this embodiment, both the load receiving, and load discharge ends of the conveyance is able to move length-wise along the container in order to properly receive and discharge the load being carried from one conveyance to the next. This includes the ability to extend and protrude beyond the external dimensions of the container.

In another embodiment, the container with single or multiple conveyances installed on or within, may be joined to an adjacent container in such a way that the containers may move with respect to one another in any vertical, horizontal or axial plane, but remain sturdily connected along a longitudinal plane with respect to one another. In another embodiment, the connection may also incorporate a towing point that enables a container, or run of multiple containers to be moved about without lifting.

In another embodiment, the container may provide for the housing of the traction drive system and/or associated electrical components, motors, transformers, switchgear and controls required to provide the tractive effort, control and monitoring required to move the conveyance and load being carried.

In another embodiment, the container may house belt tensioning systems and maintenance locations associated with the conveyance.

In another embodiment, the container may provide for the transfer of the load being carried by one conveyance onto another conveyance. The difference in flow path or direction between one conveyance and another may be in any direction, angle or plane with respect to one another. In another embodiment, this transfer location may include chutes, channeling or other directional apparatus to help direct efficient flow of loads being transferred.

In another embodiment, the container may provide for a means of vertical access for personnel to be elevated or lowered in order to access components of the container or conveyance system. The means may include stairs, ladders, graded ramps or the like.

In another embodiment, the container may provide means for transporting loads such as tools, equipment, parts, consumables or the like in a vertical manner. Means of moving the load within the container may include any lifting mechanism, winch, hoist, crane, pulley or system of pulleys, elevator or movable platform for the raising and lowering of loads.

In another embodiment, the container and conveyance may provide for the loading or flow of material onto the conveyance, or multiple conveyances, from either end, or any position along either side, roof or floor of the container. This may be at a relatively fixed location with respect to the container, or be a relocatable and moveable point along the container and conveyance.

In another embodiment, the container include one or more doors, windows or other panels that operate pivotably, slidably or removably to allow access to and from the container. In another embodiment, access doors, windows or other panels may be located on any end, side, roof or floor of the container.

In another embodiment, the container may include provision for the installation of suitably-constructed poles for the support of aerial electrical cables. The poles may be installed into position or the poles may be recessed and stored in the exterior of the container for transport purposes and then rotated into position for use upon installation.

In another embodiment, the container may provide means to transfer the load being carried by one or more conveyances, to the next conveyance or conveyances in the series.

In another embodiment, the container may be installed in a horizontal manner, vertical manner or in any other manner as required for operation.

In another embodiment, the container may be fitted with various types of conveyances which may include but not be limited to rubber belt conveyors, chain conveyors, augers, pipe conveyors and vertical and sub-vertical elevators.

BRIEF DESCRIPTION OF THE DRAWINGS

A preferred embodiment of the invention will now be described with reference to the accompanying drawings, wherein:

FIG. 24 shows a conveyance system that is joined along the longest side in order to create multiple conveyor runs in parallel;

FIG. 25 shows a conveyance system that is fitted within a modified container size;

FIG. 26 shows a conveyance system that is fitted within a modified container size;

FIG. 27 shows a conveyance system that is fitted within a modified container size;

FIG. 35 shows a conveyance system that is fitted within a container and is able to be transported longitudinally along the length of the container run.

DESCRIPTION OF EMBODIMENTS

Figure 1:
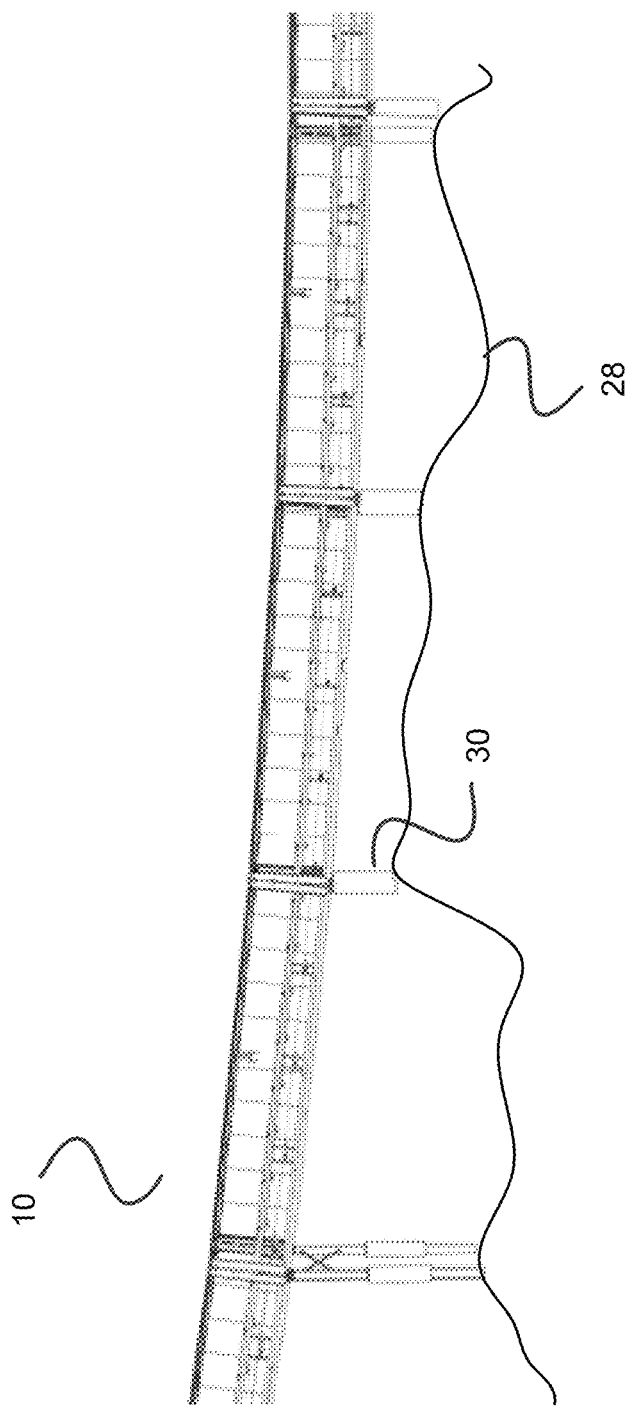
FIG. 1 shows one embodiment of a conveyance system according to the present invention in which the conveyance system spans water.

FIGS. 1 to 35 show various embodiments of a modular conveyance system 10 according to the present invention. The conveyance system 10 includes a container 12 having a top 14, a base 16, side walls 18 and end walls 20; and a conveyor frame 22 housed within the container 12 in an operational ready state, wherein in a first configuration the side walls 18 and end walls 20 are fixed to form an enclosure around the conveyor frame 22 for transport of the conveyance system 10, and in a second configuration the end walls 20 are removable to allow extension of the conveyor frame 22 therethrough, and at least a portion of one of the side, top or bottom walls or surfaces 18 is removable to provide access to the conveyor frame 22 during use, so that the container 12 and the conveyor frame 22 are transported and installed as a single unit.

The container 12 may be a standard size (40 ft or 12 m) shipping container or any other appropriate size to accommodate the conveyor frame 22 and/or the application. The conveyor system 10 is shipped as a modular unit to an installation site. Accordingly, transport costs are limited to the shipping container which is typically not weight dependent.

Figure 2:
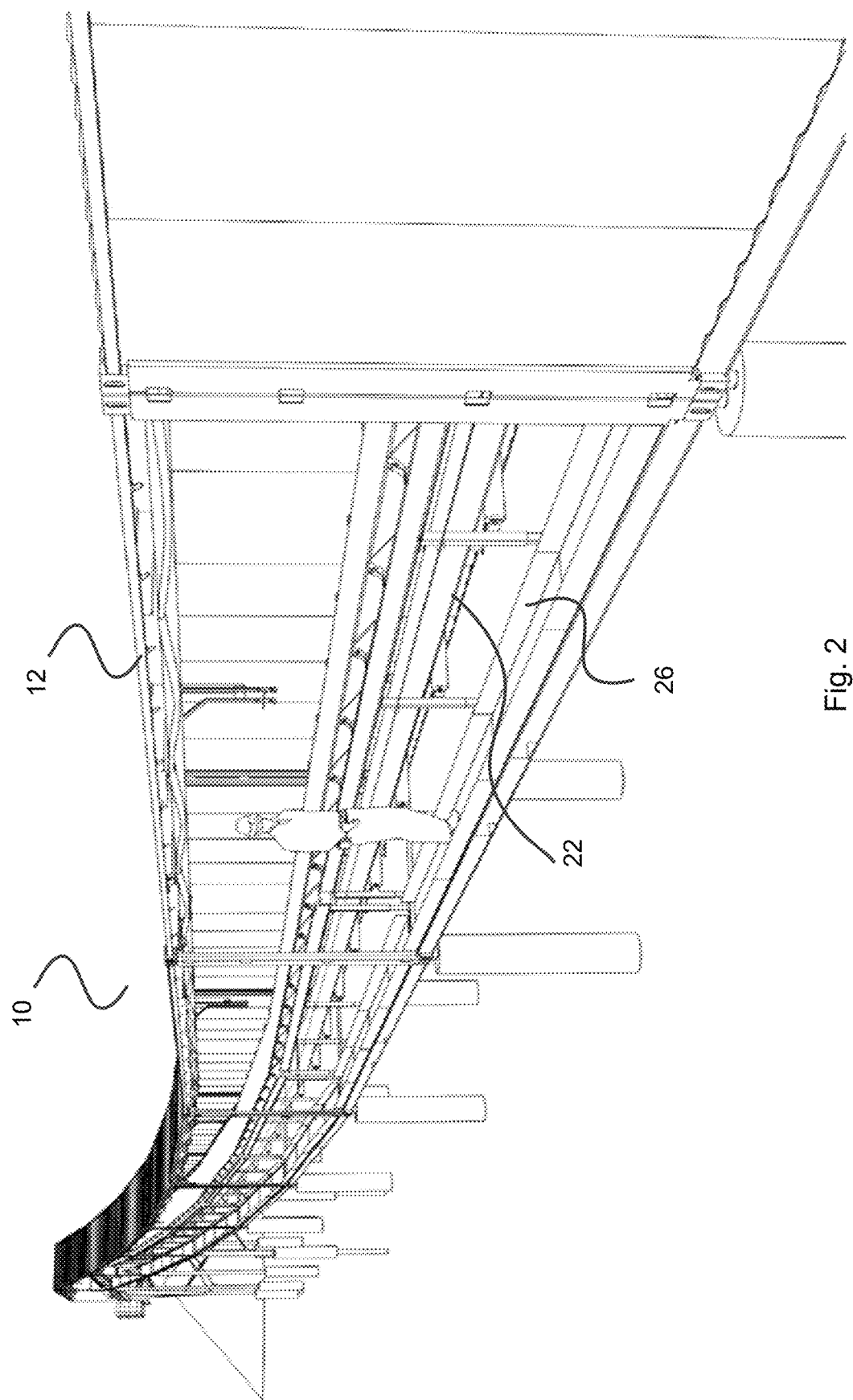
FIG. 2 shows a perspective view of the conveyor system of FIG. 1, in which the side panels have been removed to form a platform/walkway.
Figure 3:
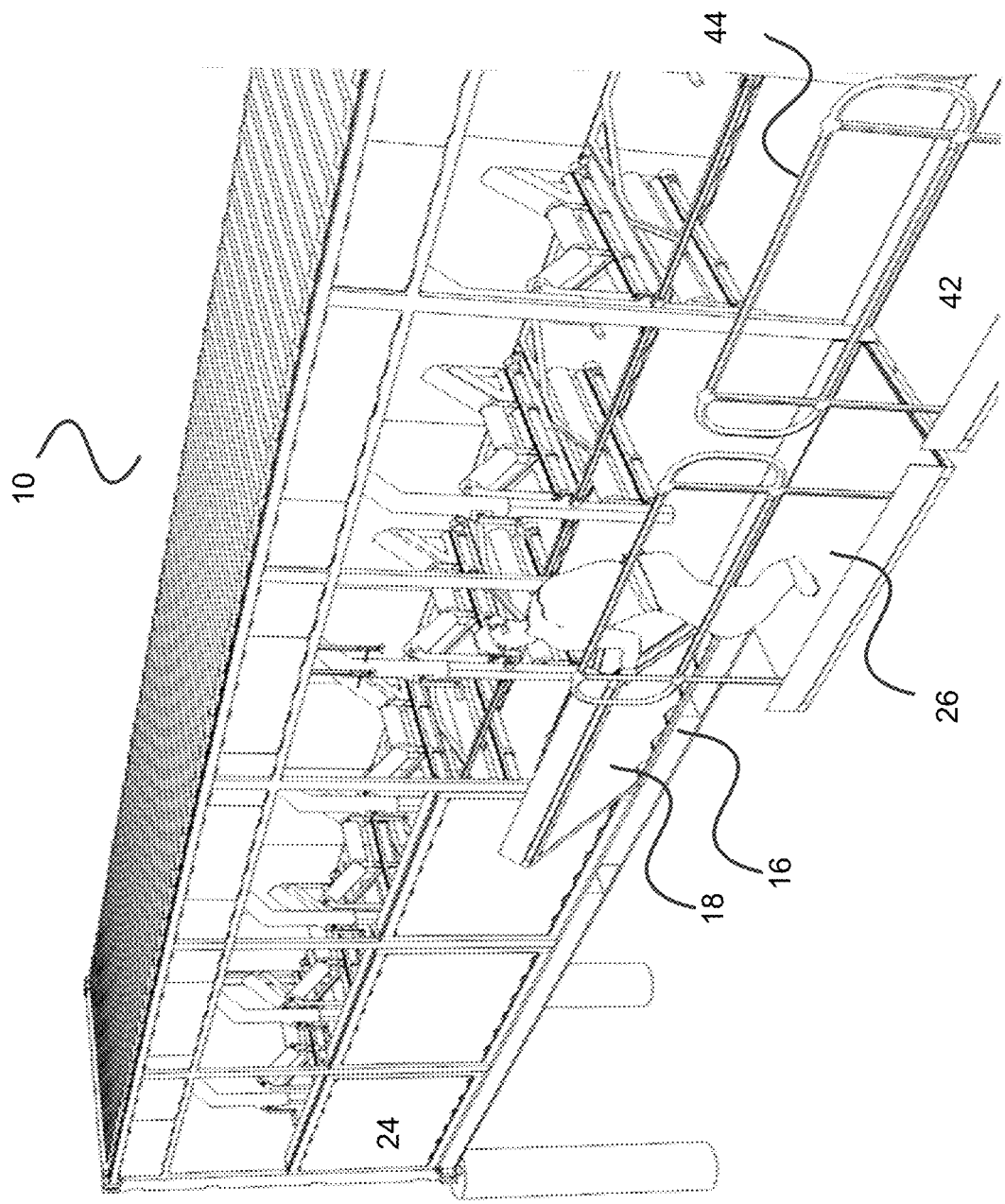
FIG. 3 shows the conveyor system of FIG. 1 mounted on concrete or steel-type foundations secured into the ground, and wherein side panels are being used to create a walkway/platform for access to the conveyor frame.

As best seen in FIGS. 2 and 3, a platform/walkway 26 is provided. The container 12 may include removable panels 24 or sidewalls 18 which can be positioned adjacent the base 16 to serve as a platform/walkway 26 along the conveyor frame 22 and also for access to the conveyor frame 22.

Figure 9:
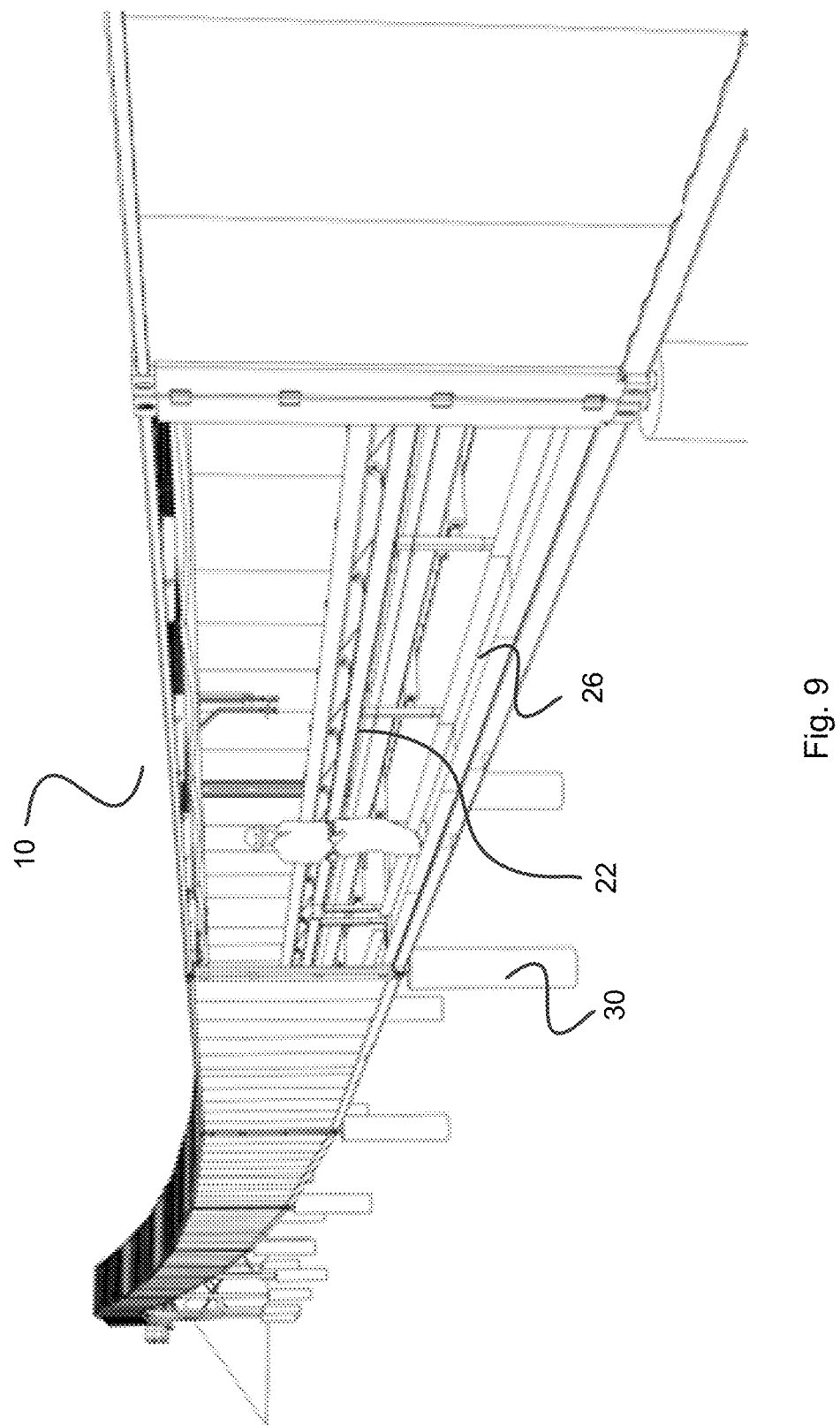
FIG. 9 shows the conveyance system wherein one side panel is removed.
Figure 10:
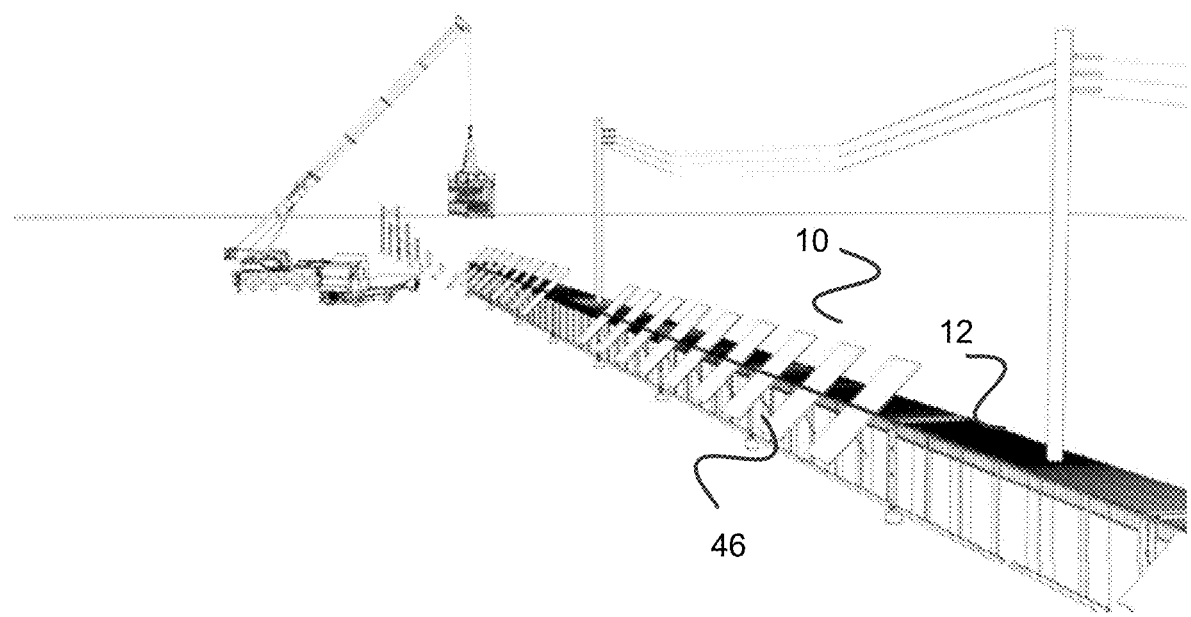
FIG. 10 shows a conveyance system having removable, movable or fixed solar panels on either or all sides of the container.
Figure 11:
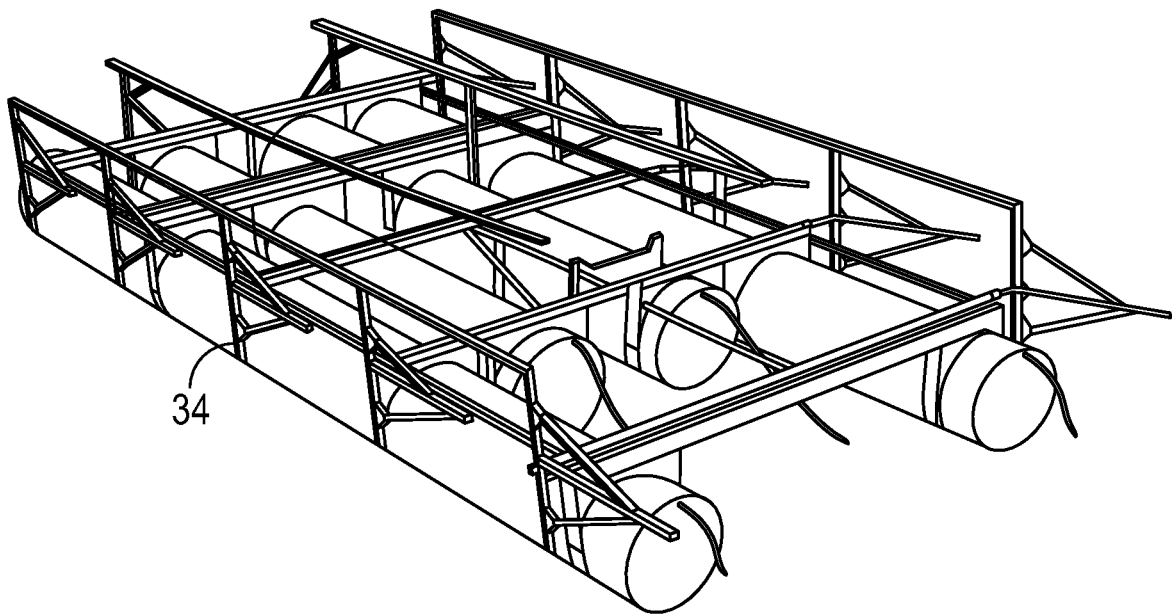
FIG. 11 shows a floating catamaran type buoyancy assembly connectable to the container.
Figure 12:
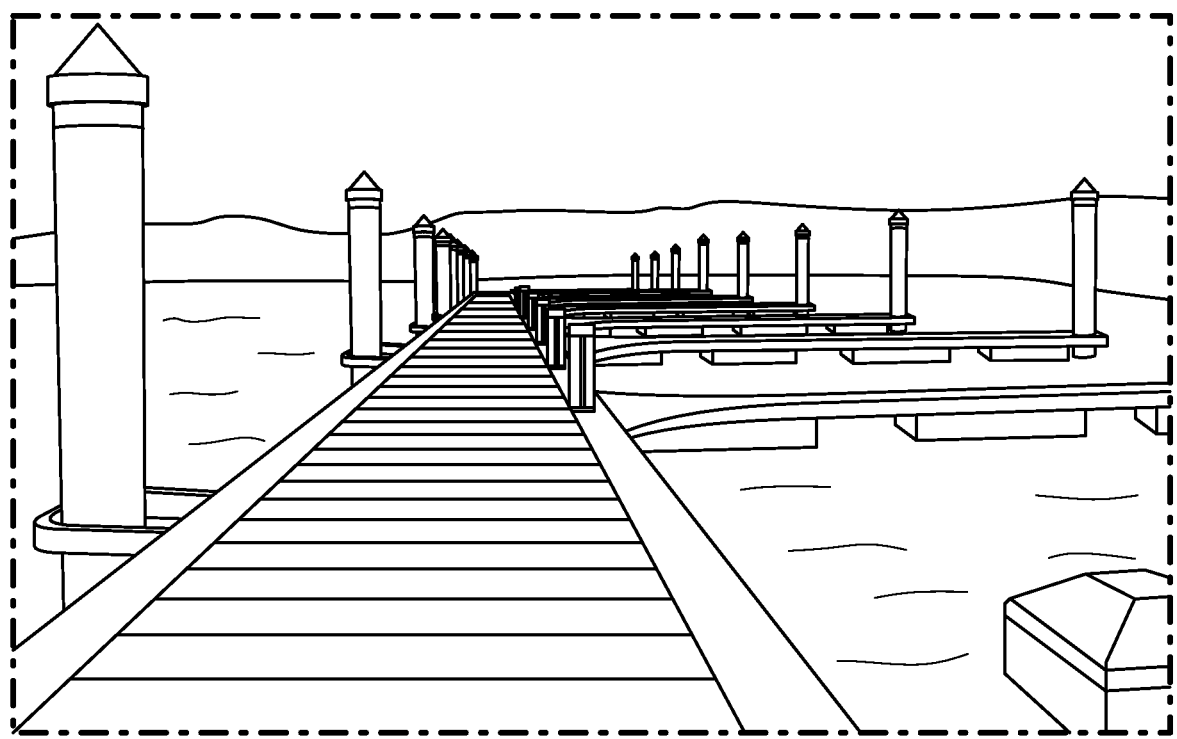
FIG. 12 shows a floating pontoon type buoyancy assembly.
Figure 13:
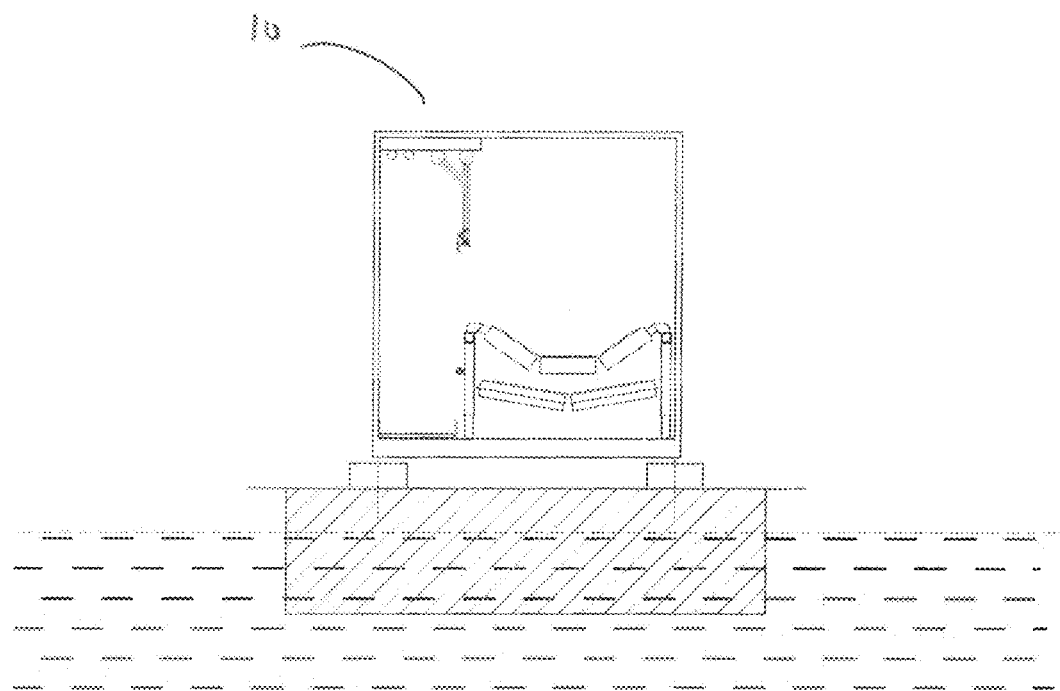
FIG. 13 shows a conveyance system according to another embodiment of the present invention mounted on a pontoon type buoyancy assembly in water.
Figure 14:
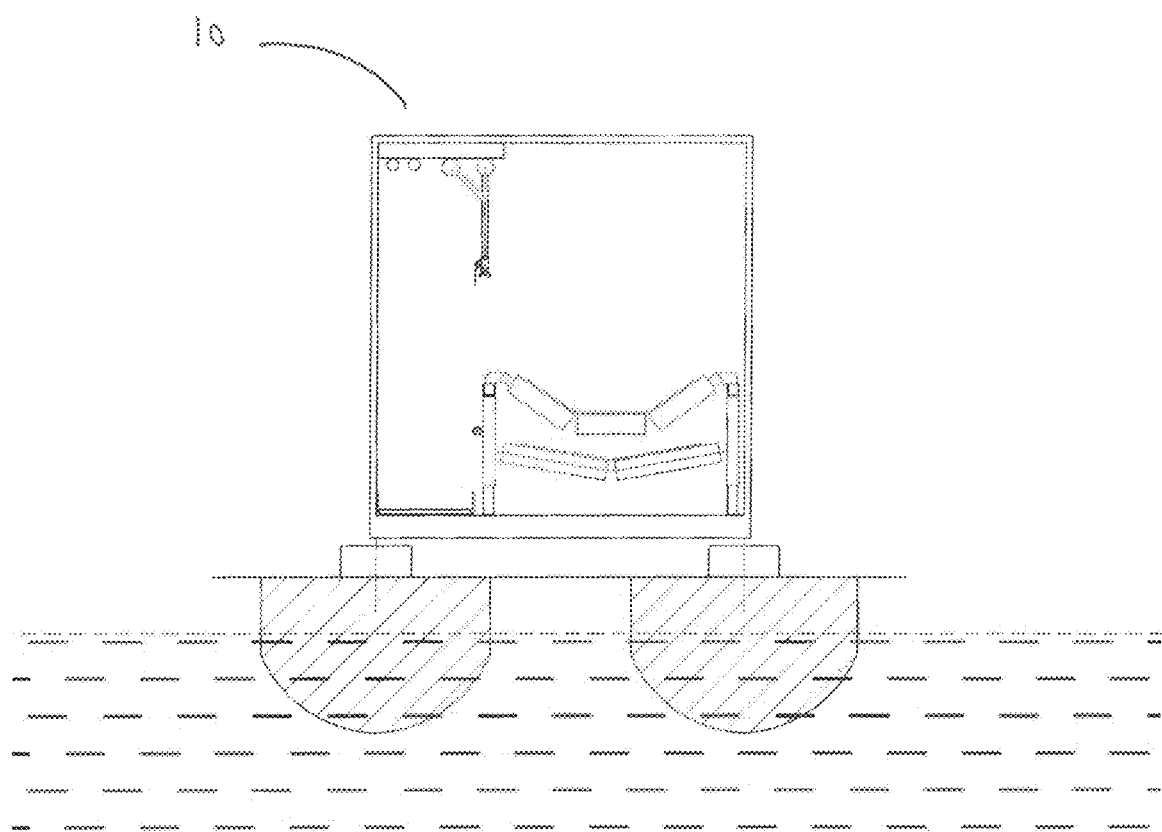
FIG. 14 shows a conveyance system according to another embodiment of the present invention mounted on a catamaran type buoyancy assembly in water.
Figure 15:
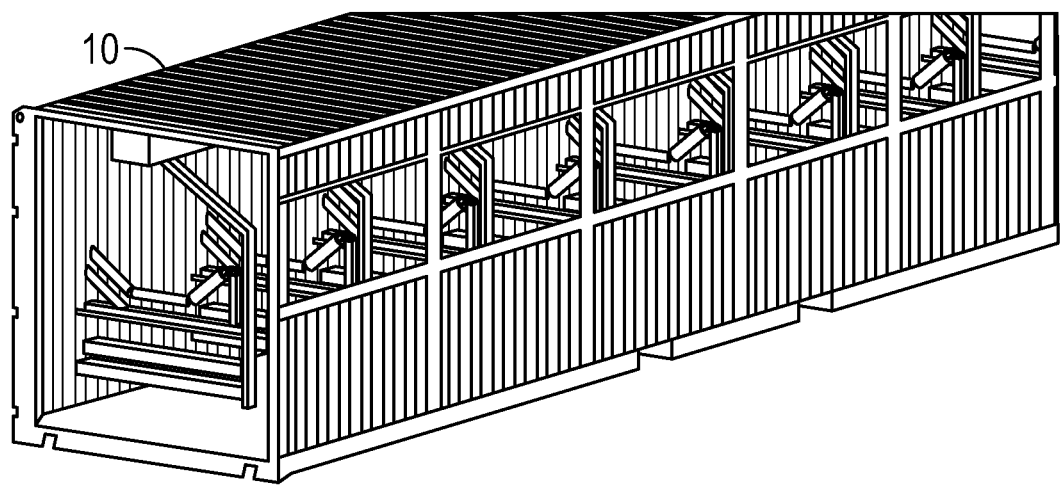
FIG. 15 shows the container and the relevant fixing, securing and lashing points.
Figure 16:
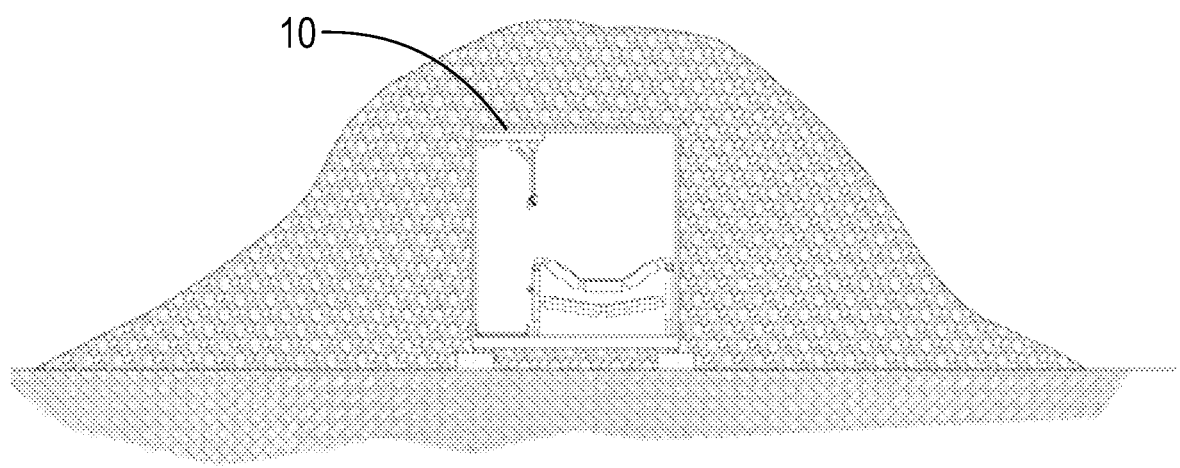
FIG. 16 shows a conveyance system according to a further embodiment having a container adapted for burial by overlain fill material.
Figure 17:
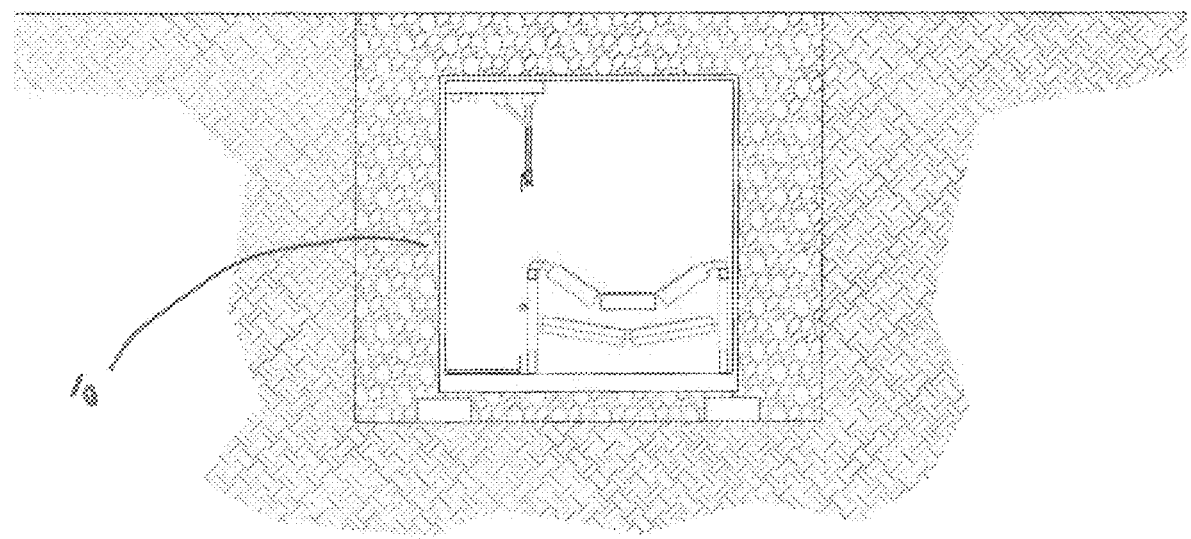
FIG. 17 shows a conveyance system according to a further embodiment having a container adapted for burial within the terrain.
Figure 18:
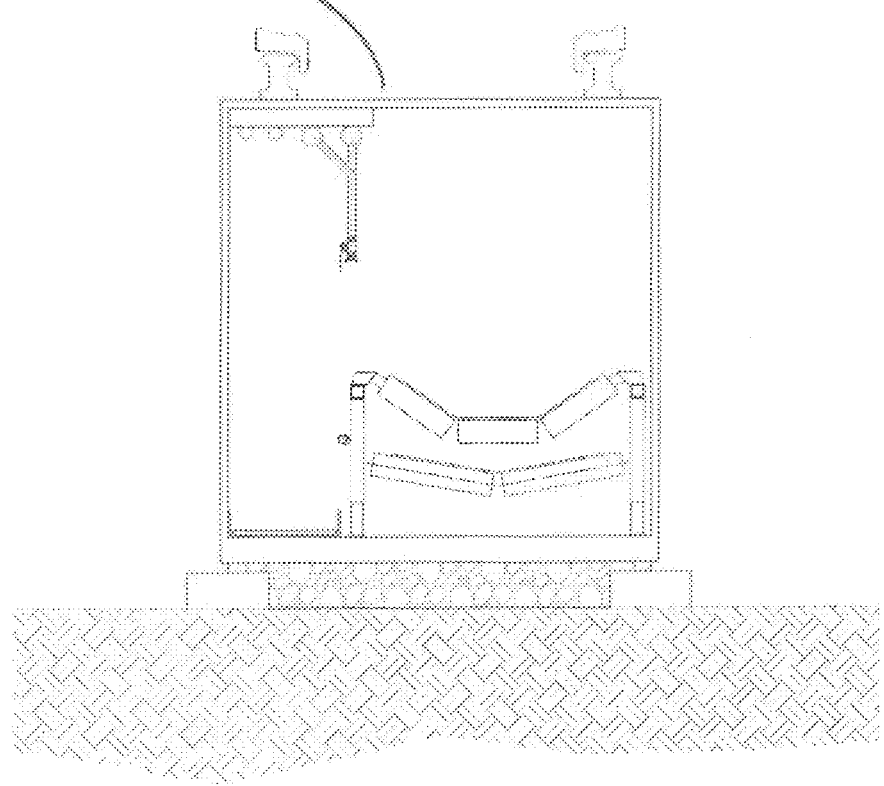
FIG. 18 shows a conveyance system according to a further embodiment having a container adapted for the transport of other containers, personnel, goods, equipment or other materials on rails on top of the container.
Figure 19:
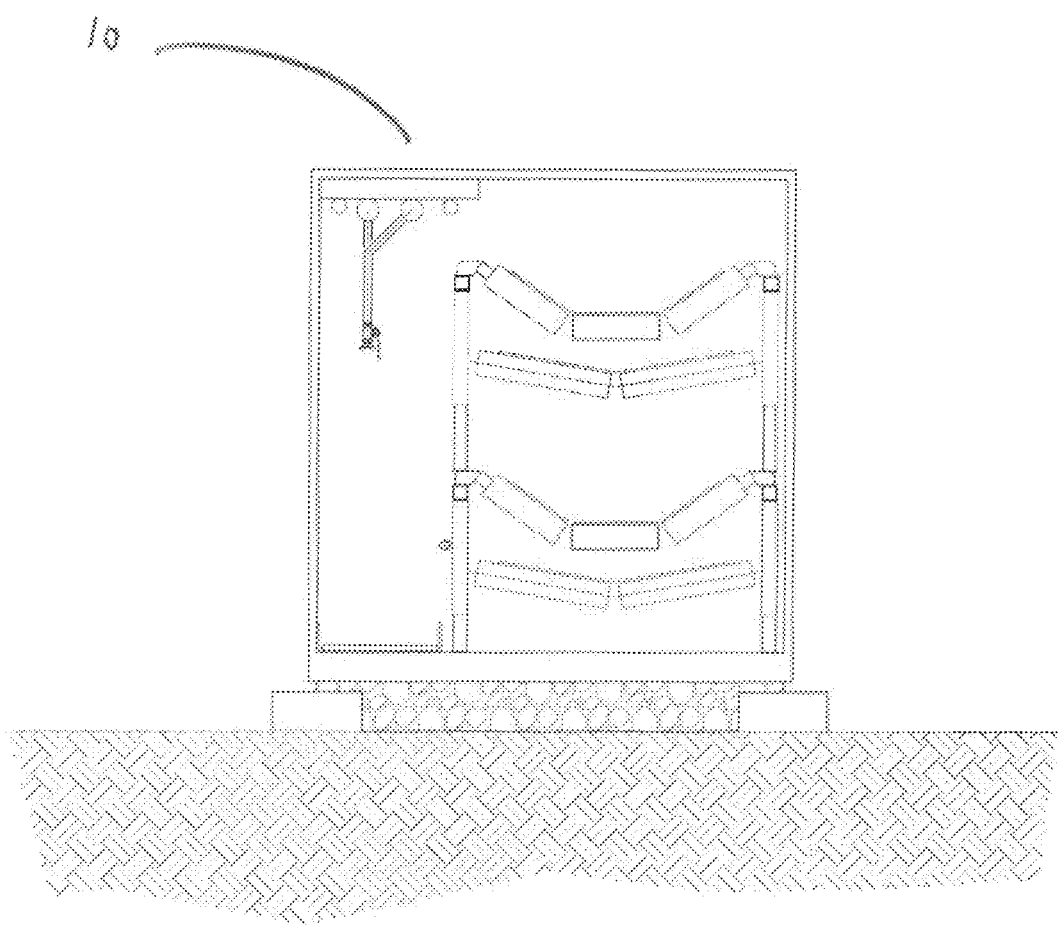
FIG. 19 shows a conveyance system with an additional conveyor frame installed within the same container.

FIGS. 9 and 10 show a conveyance system 10 having a platform/walkway 26 within the container 12. In this configuration the top 14 acts as a roof from environmental conditions. Solar panels 46 may be added as a power source.

Figure 4:
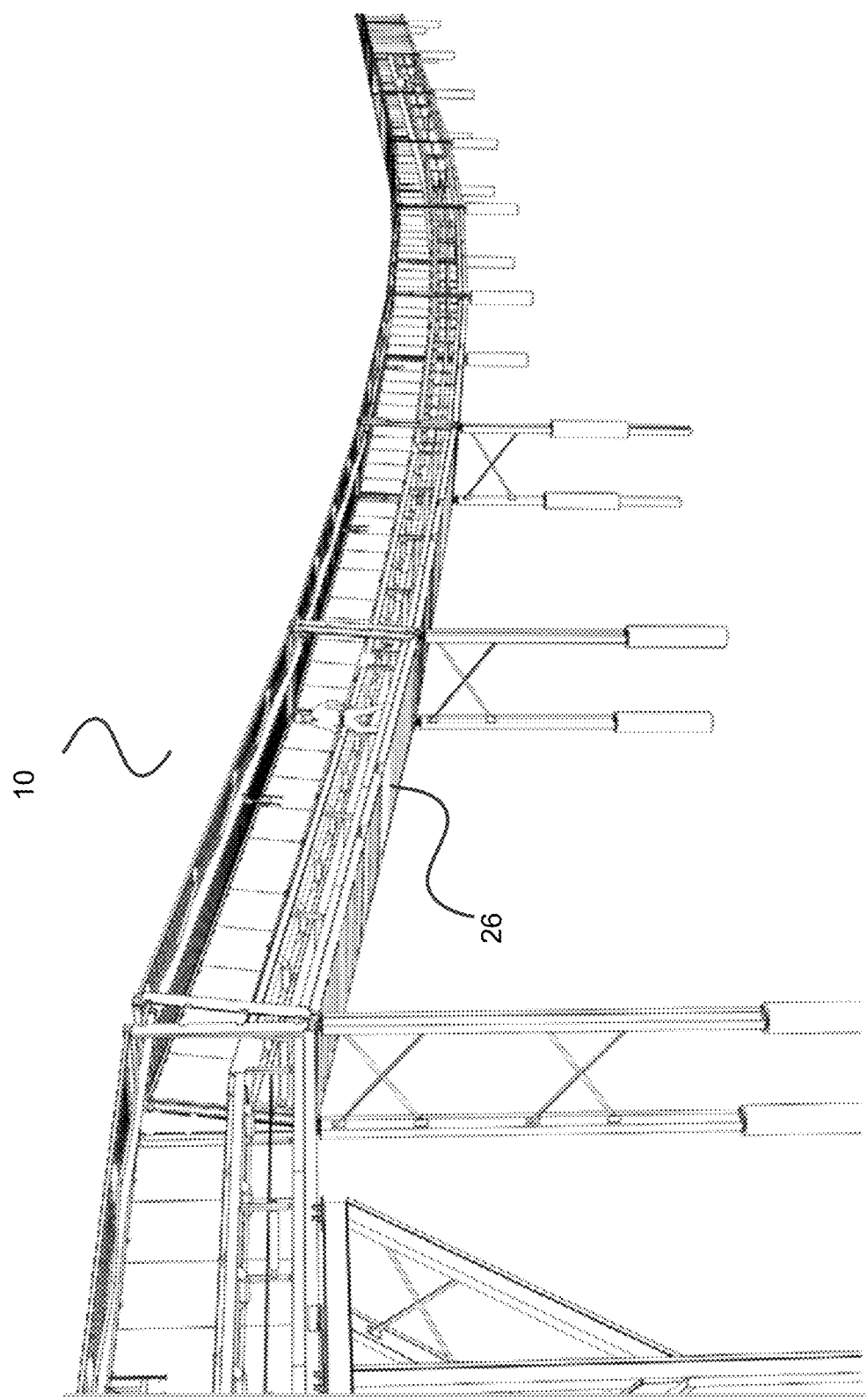
FIG. 4 shows the conveyance system of FIG. 1 on steel or concrete supporting frames.
Figure 7:
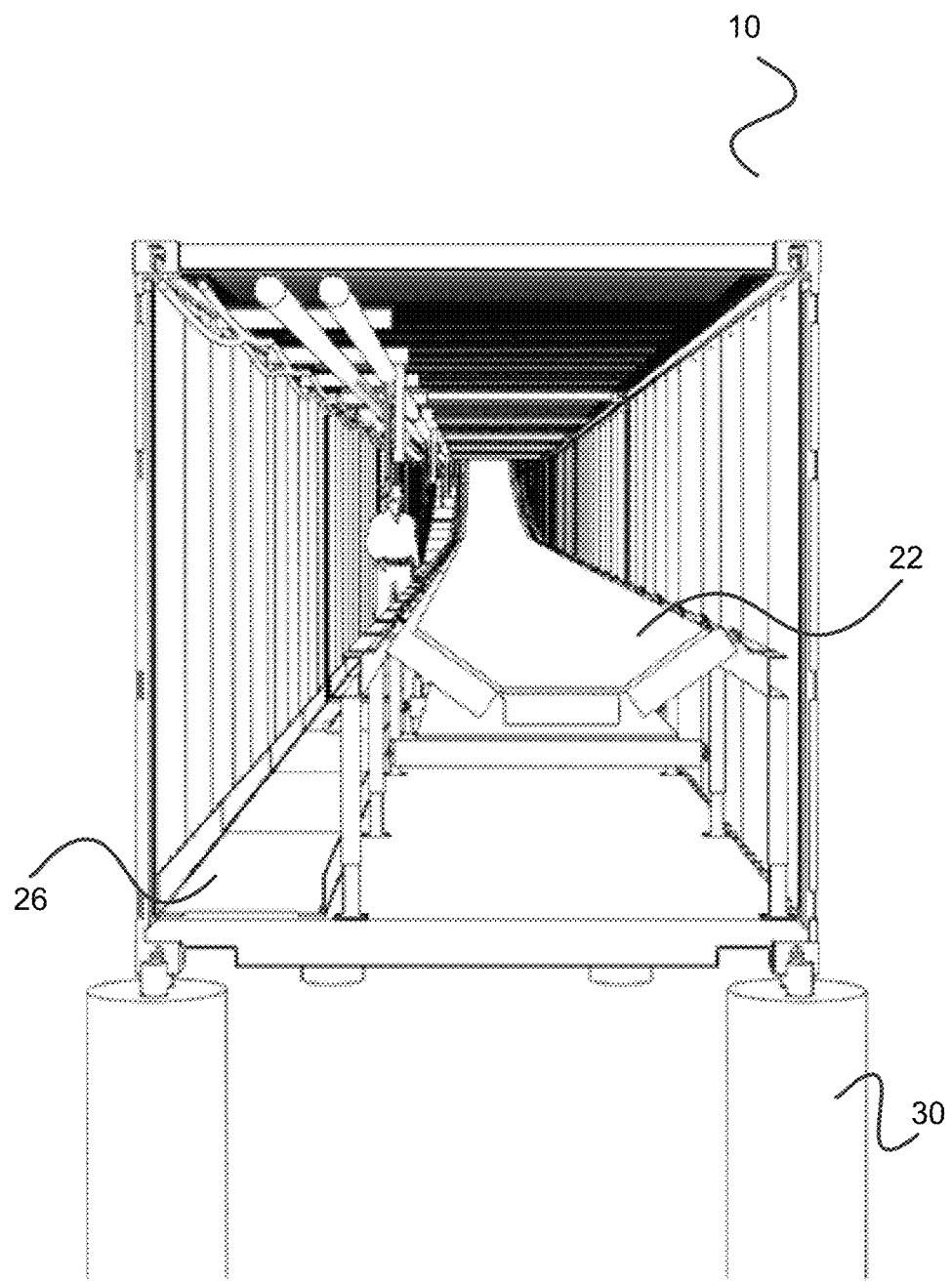
FIG. 7 shows an end view of the conveyance system containing a fixed conveyor frame in an operational ready state.
Figure 8:
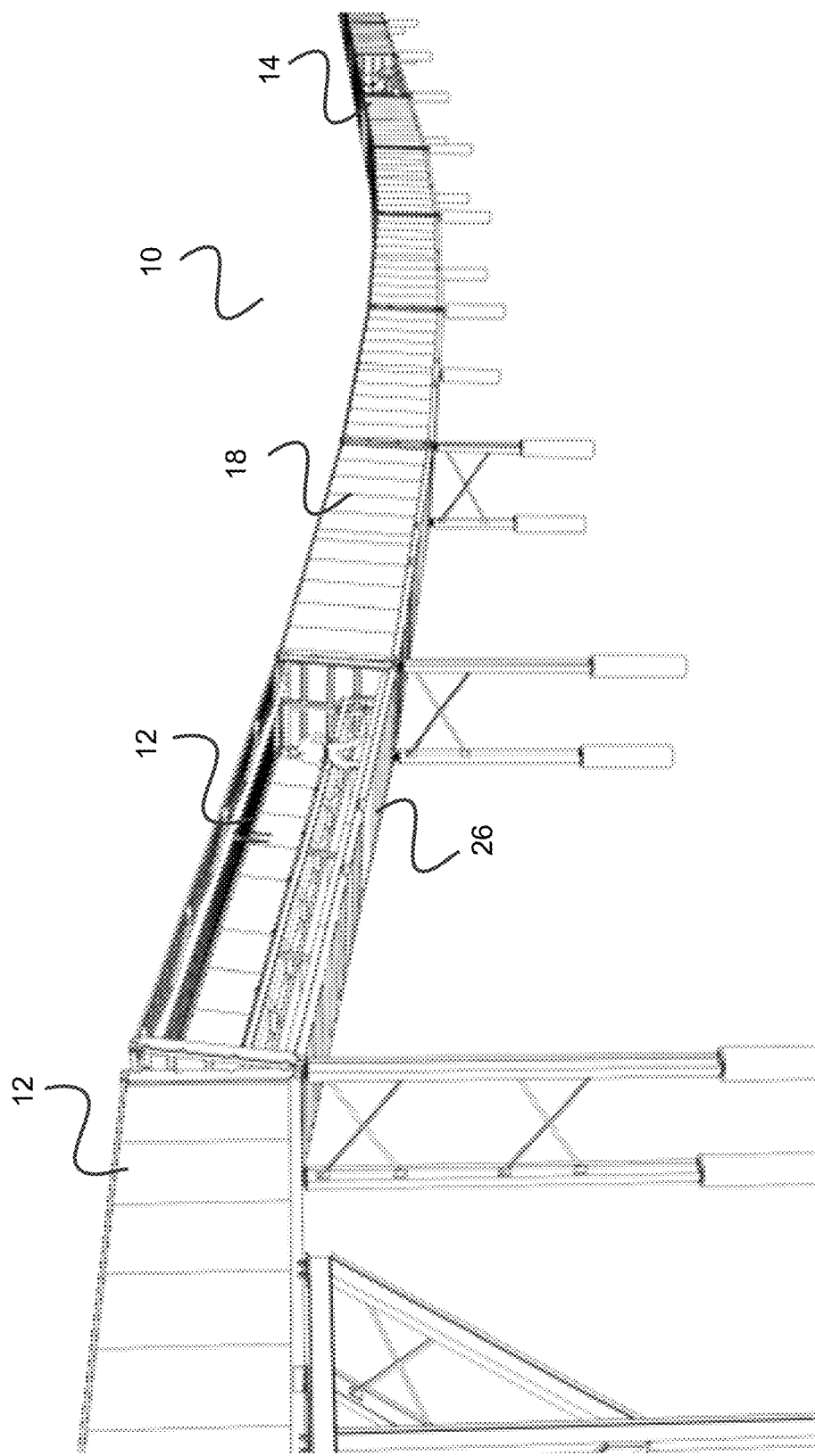
FIG. 8 shows the conveyance system according to an embodiment wherein access to the conveyor frame is within the container.

As shown in FIG. 3, a side wall 18 may be removable from its transport configuration and attached to the base 16 so that it extends outwardly from and generally parallel to the base 16. This provides a platform/walkway 26 within the container 12 as shown in FIGS. 7 to 9 or outside the container as best seen in FIGS. 2 to 4. Grating 42 and handrails 44 are already included or added later for safety.

It is envisioned that other container widths and heights are also applicable. In this system 10, container 12 may be that of a modified high cube, having a width greater than a standard container. The larger width allows for an access platform 26 within the container 12. This negates the need for a fold-down or slide-out walkway to accommodate pedestrian traffic. The additional width also allows for more than one conveyor frame 22 to be installed across the width of the container 12. Additional height may allow for additional conveyors or other services to be installed within the container 12.

As shown in FIGS. 1-10 multiple modular conveyance systems 10 may be installed to form a continuous conveyor run. The conveyance systems 10 may be installed in multiple configurations including a horizontally straight and level configuration suitable for level terrain, a vertical and/or horizontal configuration to negotiate undulating terrain or a horizontally straight and curved configuration to negotiate turns and the like. As shown in FIG. 1 successive modules 10 may be connected in a generally straight profile and span a waterway 28. The conveyance system 10 is mounted on pier-type foundations 30. It is envisaged that the containers will be appropriately affixed to the piers by mechanical fixings of either steel or another appropriate material. Pile/pier footings 30 are positioned at each end of each container 10 equating to every 40 ft (12 metres), or other distance as appropriate. If multiple containers are adjoined to form one rigid structure, the pile/pier footings 30 may be at a greater distance than 40 ft (12 metres). The container 10 is securely attached to the footings 30 with appropriate mechanisms. The footings 30 may be concrete or steel depending on terrain and application.

Figure 5:
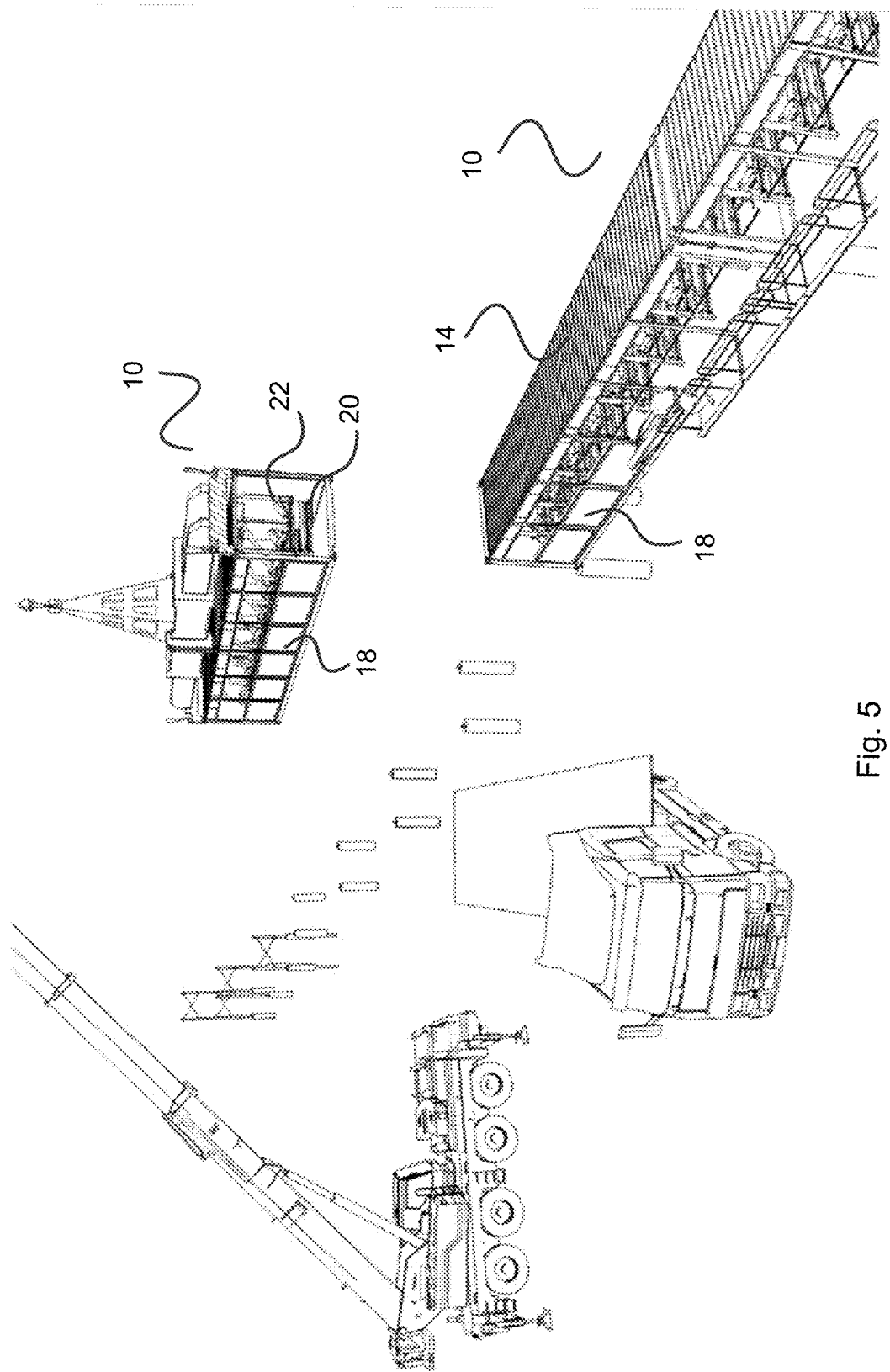
FIG. 5 shows a crane positioning the modular conveyance system of FIG. 1 adjacent to another modular conveyance system of FIG. 1 to form a continuous run.
Figure 6:
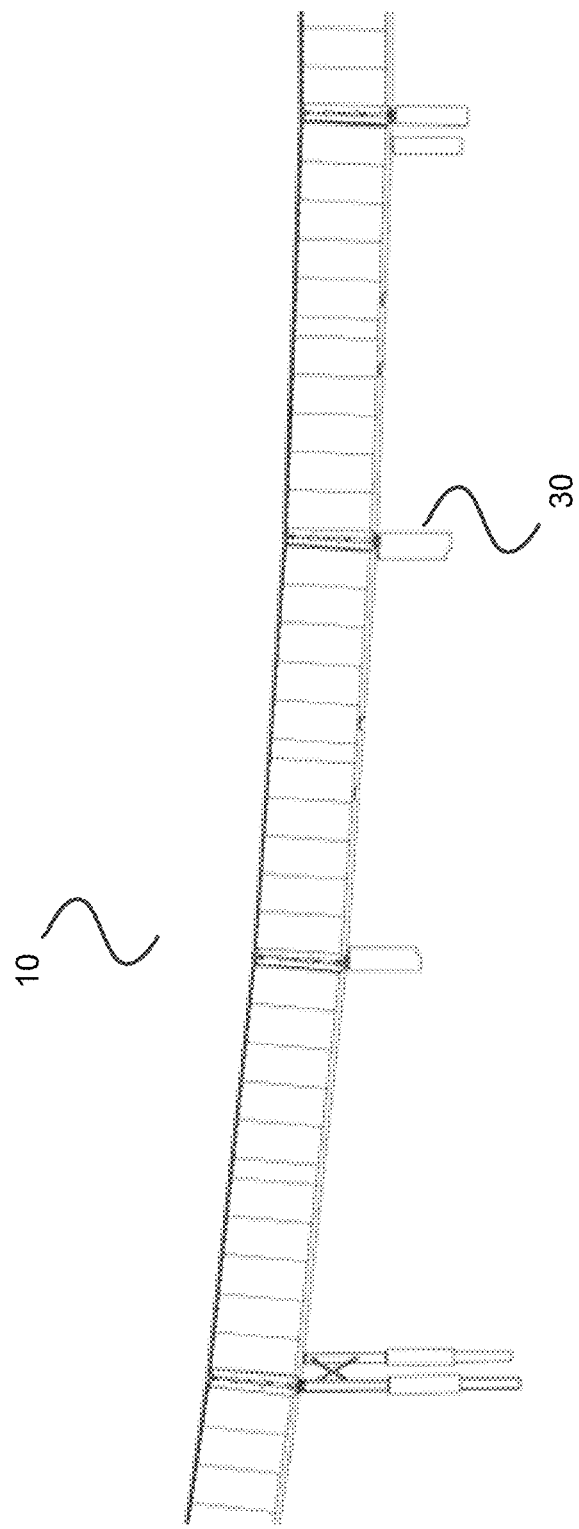
FIG. 6 shows the conveyance system of FIG. 1.

As shown in FIG. 5, the modular conveyance systems 10 may be installed by crane or other appropriate lifting mechanism. They may also be installed over the top of one another by utilising a specialised transport sled, mounted on rails or similar on top of the container 12, and lowered into place from above.

During installation the rubber belting for the conveyor frame 22 may either be pulled along as each successive module 10 is installed and joined to a free end, or may be installed in one operation after all modules 10 are in place. Pulling the rubber belting material through is usually conducted by a combination of winch, winch rope and appropriate strapping and slings.

The drive unit, which provides the tractive effort for moving the rubber belting, may be installed, usually on the ground level, on a pre-prepared concrete slab or foundation. This method of installation is typically conducted by others.

The drive unit, which provides the tractive effort for moving the rubber belting, may also be installed, usually on the ground level, within a container specified for the purpose.

As shown in FIG. 8, the conveyance system 10 may also be installed on a supporting structure 38 formed from steel, concrete, or other suitable material.

Figure 22:
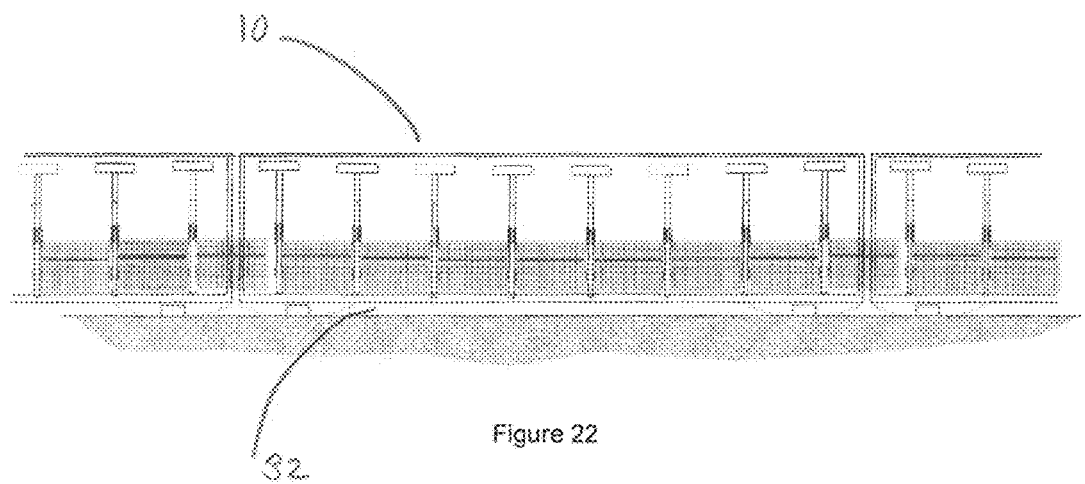
FIG. 22 shows a conveyance system mounted on skids suitable for mounting directly on the ground and joined to successive modules in the run.

FIG. 10 also shows aerial power conductor supporting poles that are integrated into the structure of the container and are rotated into position, and extendable to adjust the overall height Alternatively, as shown in FIG. 22, the conveyance system 10 may be installed on a skid plate 32 for mounting directly onto the ground and relying on weight and joining mechanisms for stability.

It is envisioned that other mounting methods are also suitable. For example, the container 12 may be mounted on pontoons 34 or catamarans 36 (see FIGS. 11-14), allowing the conveyor system 10 to be used over water. This helps to reduce Capital Expenditure costs for port construction and negates the need for costly barging of bulk solids materials across or along rivers, estuaries, open water or other waterways.

Figure 20:
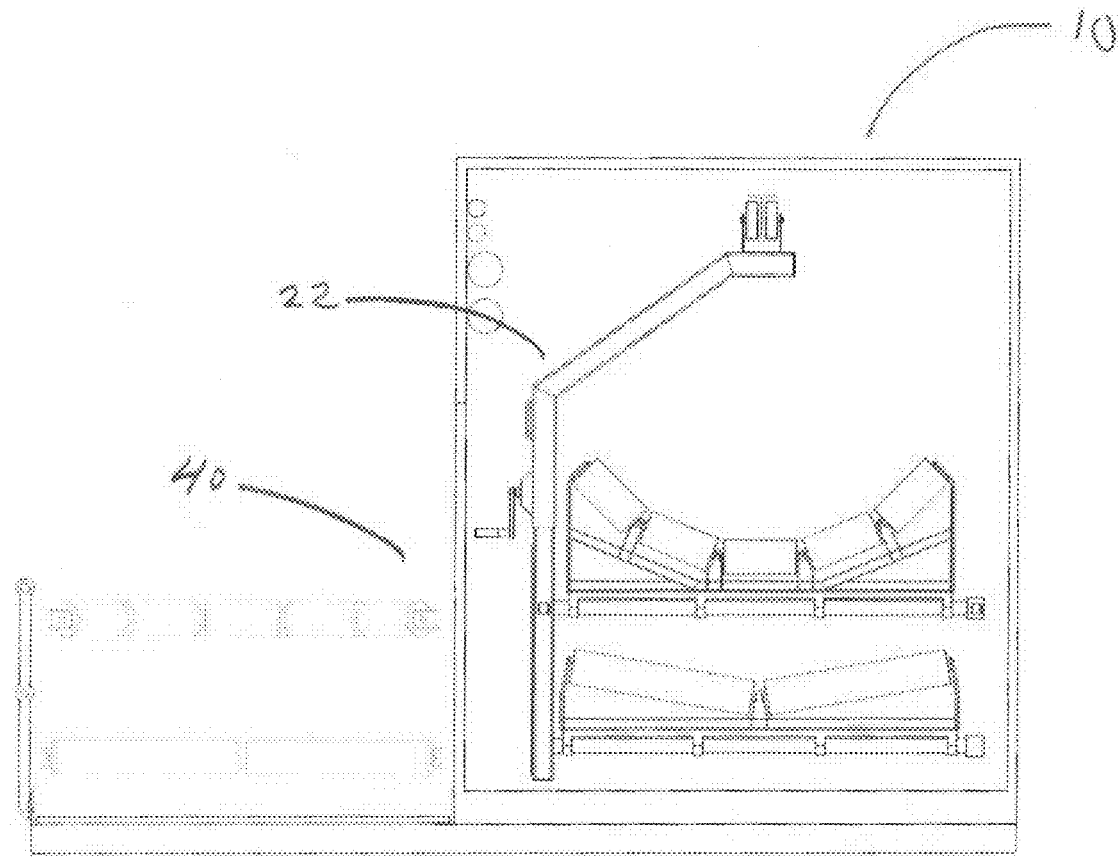
FIG. 20 shows a conveyor frame installed in the container and supported by an overhead rail, allowing the conveyor system to traverse longitudinally along the container run, and a spare idler mechanism.
Figure 21:
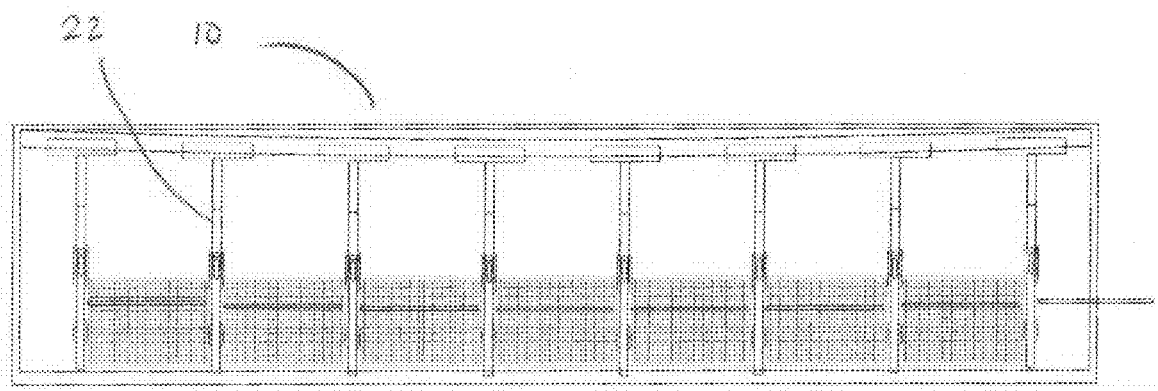
FIG. 21 shows an elevation view of the conveyance system of FIG. 20.

FIGS. 20 and 21 show a conveyance system 10 having a conveyor frame 22 and access for idler frame removal 40 to allow the removal and replacement of an idler while the conveyor frame 22 is in motion.

Figure 23:
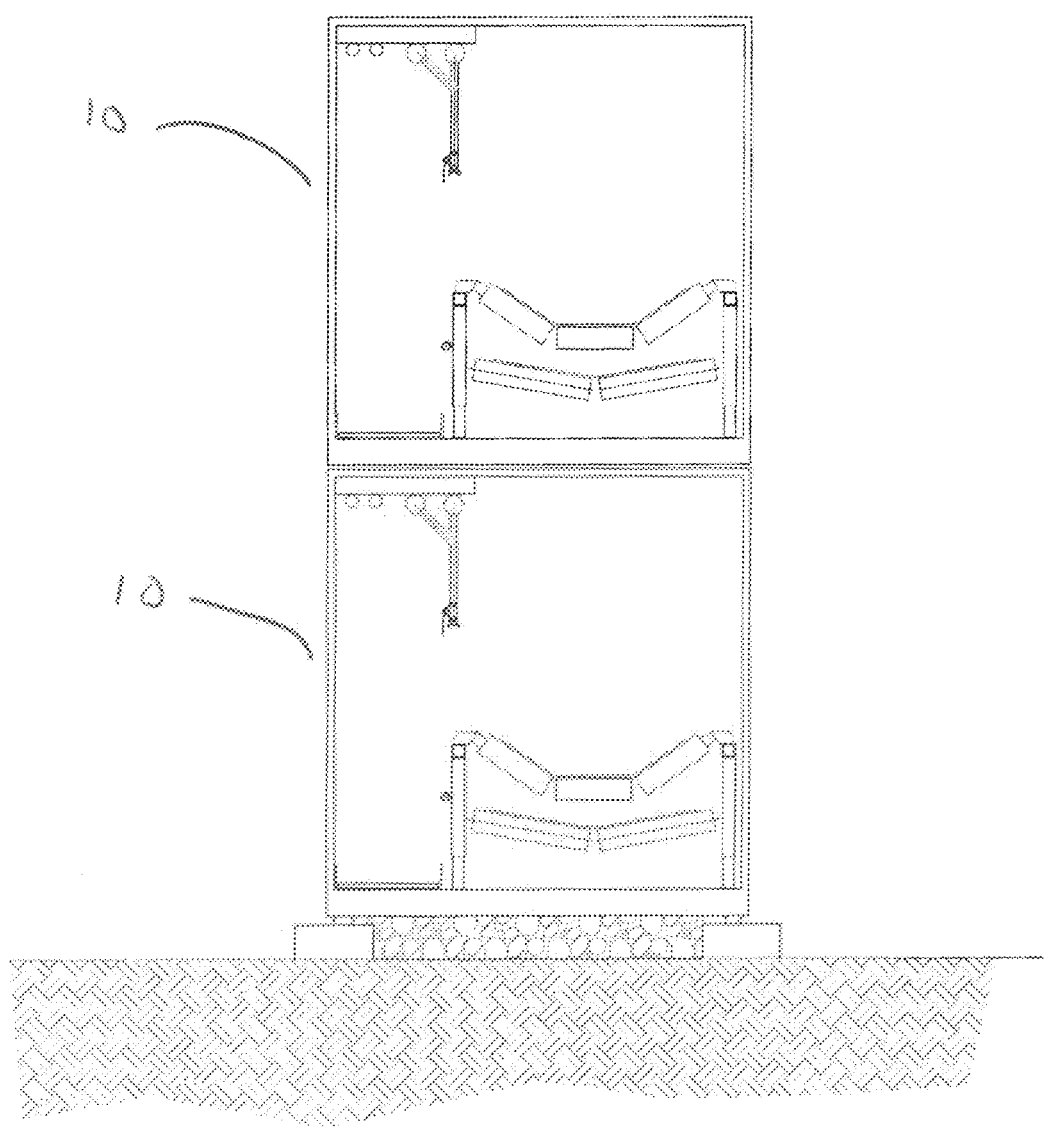
FIG. 23 shows a conveyance system that is stacked in multiples and joined for stability.

As shown in FIG. 23 modular conveyance systems 10 may be stacked on top of each other and secured thereto. This allows for multiple conveyor runs to be installed and run simultaneously.

In use multiple conveyance systems 10 are connected in series to form a continuous run. Each container 12 includes a conveyor frame 22, or multiple conveyor frames 22, along with any associated piping, reticulated services, electrical cabling and devices, communication and lighting equipment, walkways and any other required installations which can be connected with an adjacent container 12.

FIG. 25 shows a conveyance system 10 that is fitted within a modified container size, allowing a wider conveyance to be installed and used. The methodology as shown in FIG. 25 is that of a container of a taller than normal dimension. The conveyance 10 is installed on one or more sidewalls 18 of the container 12 for the purposes of transport, such that the container 12 may be transported in the normal upright position. As shown in FIG. 25, upon installation, the container 12 is rotated about its longitudinal axis such that the container 12 is in effect laying on what would otherwise be its side, and the conveyance 10 is now in the correct operating orientation. In the installed/operating position, the sidewalls of the container are now in a horizontal configuration.

FIG. 26 shows a conveyance system 10 that is fitted within a modified container size, allowing a wider conveyance to be installed and used, whereby the sidewalls are utilised for the installation of the conveyance, and is then rotated into the operating position. FIG. 26 also shows, a walkway and/or roof 26 that may be pivotably, or slidably, attached to the container 12, such that upon installation the walkway and/or roof 26 is in the correct operating position.

FIG. 27 shows a conveyance system 10 that is fitted within a modified container size, allowing a wider conveyance to be installed and used, whereby the sidewalls 18 are utilised for the installation of the conveyance, and is then rotated about its longitudinal axis into the operating position. In FIG. 27, multiple conveyances and/or walkways may be installed within the container.

Figure 28:
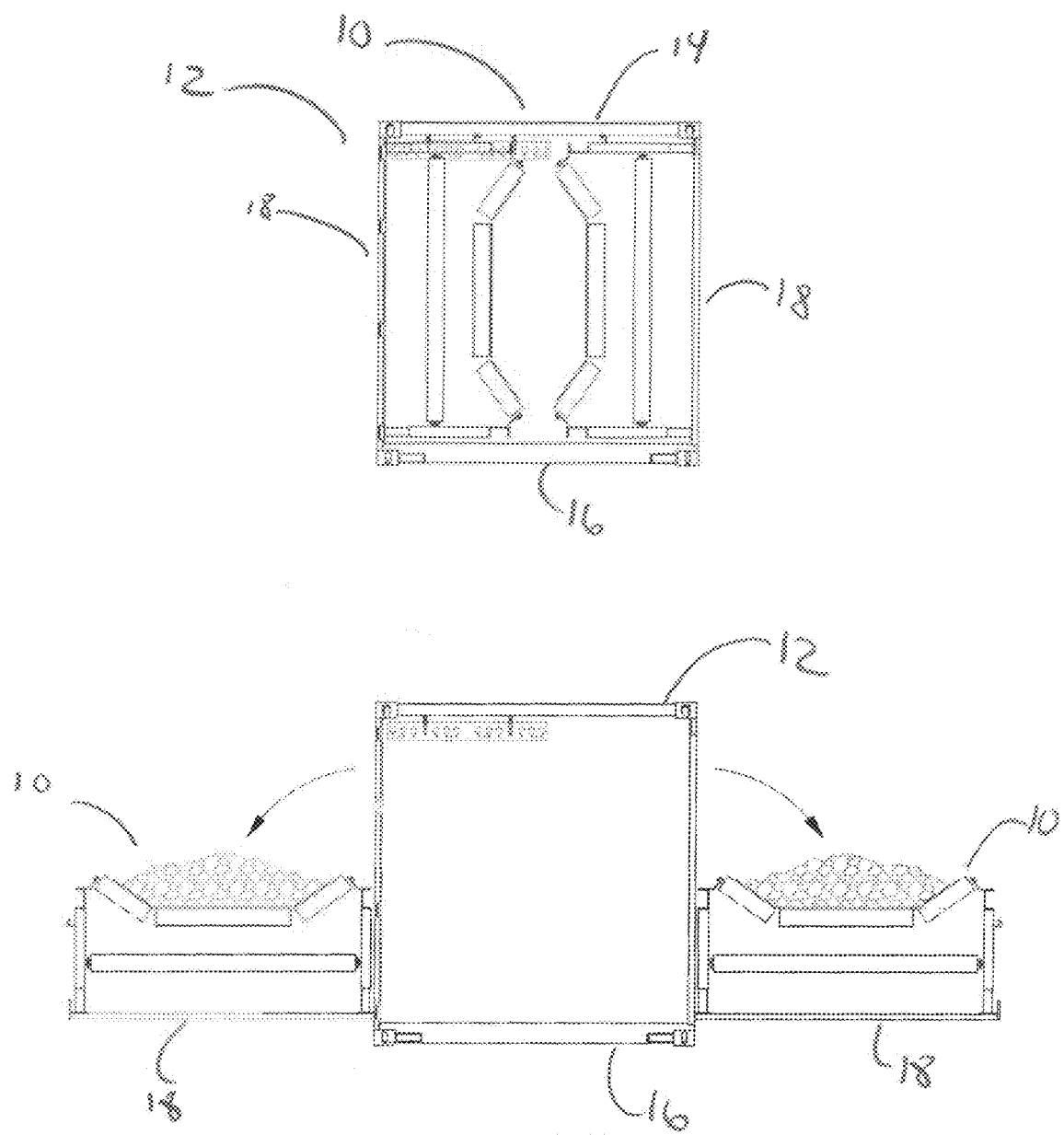
FIG. 28 shows and conveyance system that is fitted within a modified container size.

FIG. 28 shows and conveyance system 10 that is fitted within a modified container size, allowing a wider conveyance to be installed and used. The methodology as shown in FIG. 28 is that of a container of a taller than normal dimension. The conveyance 10 is installed on one or more sidewalls 18 of the container for the purposes of transport, such that the container may be transported in the normal upright position. As shown in FIG. 28, upon installation and while the container 12 remains in the normal upright position, the container sidewalls 18 may be rotated pivotably about the base 16 to a horizontal position, allowing the conveyance 10 to operate in the correct position. This may happen to one or both sides of the container 12.

Figure 29:
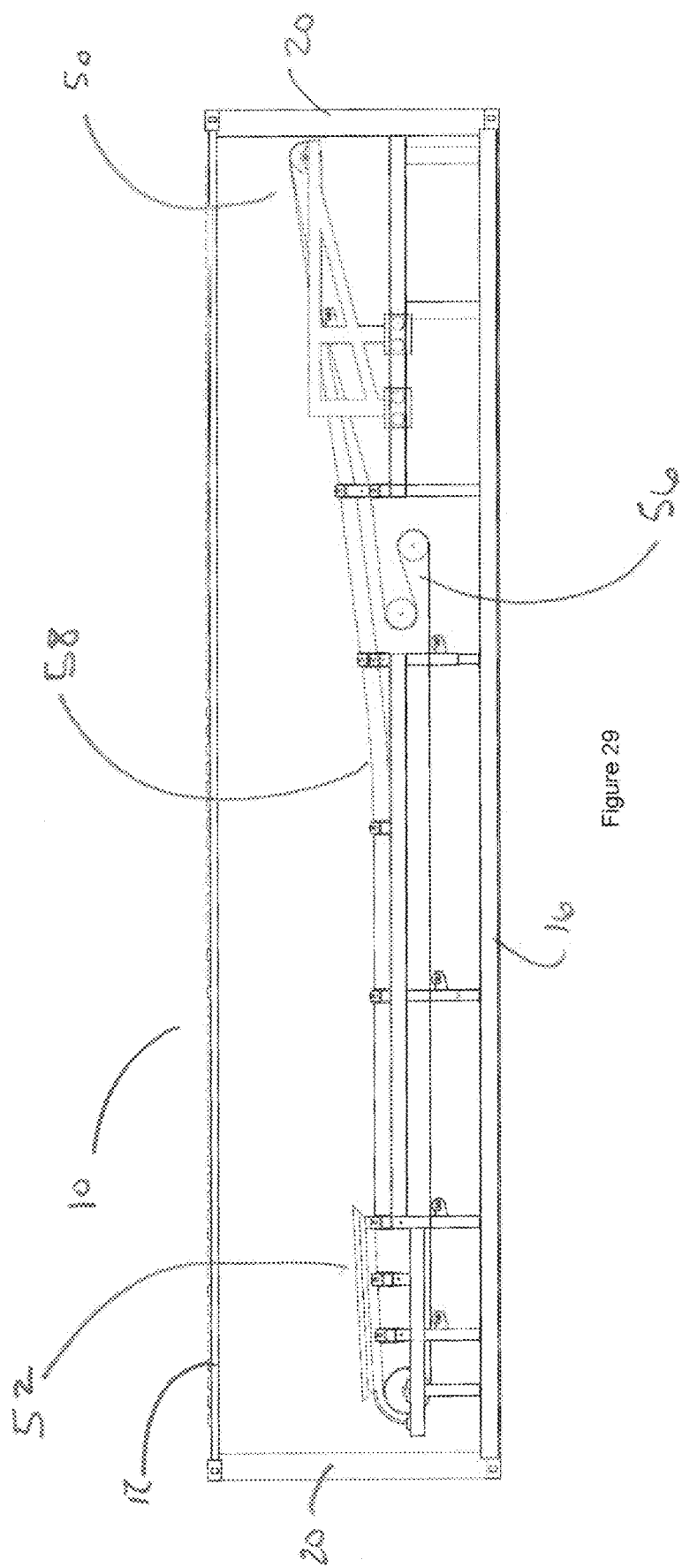
FIG. 29 shows a conveyance system that is fitted within a container in such a manner as to form a discreet conveyance within that single container.

FIG. 29 shows a conveyance system 10 that is fitted within a container 12 in such a manner as to form a discreet conveyance 10 within that single container 12, complete with a load receiving point 52, drive mechanism 56, tensioning device 58, load transfer/discharge point 50 and supporting frames in between the two distant ends. Both the load receiving, and load discharge end of the conveyance can move length-wise along the container in order to properly receive and discharge the load being carried from one conveyance to the next.

Figure 30:
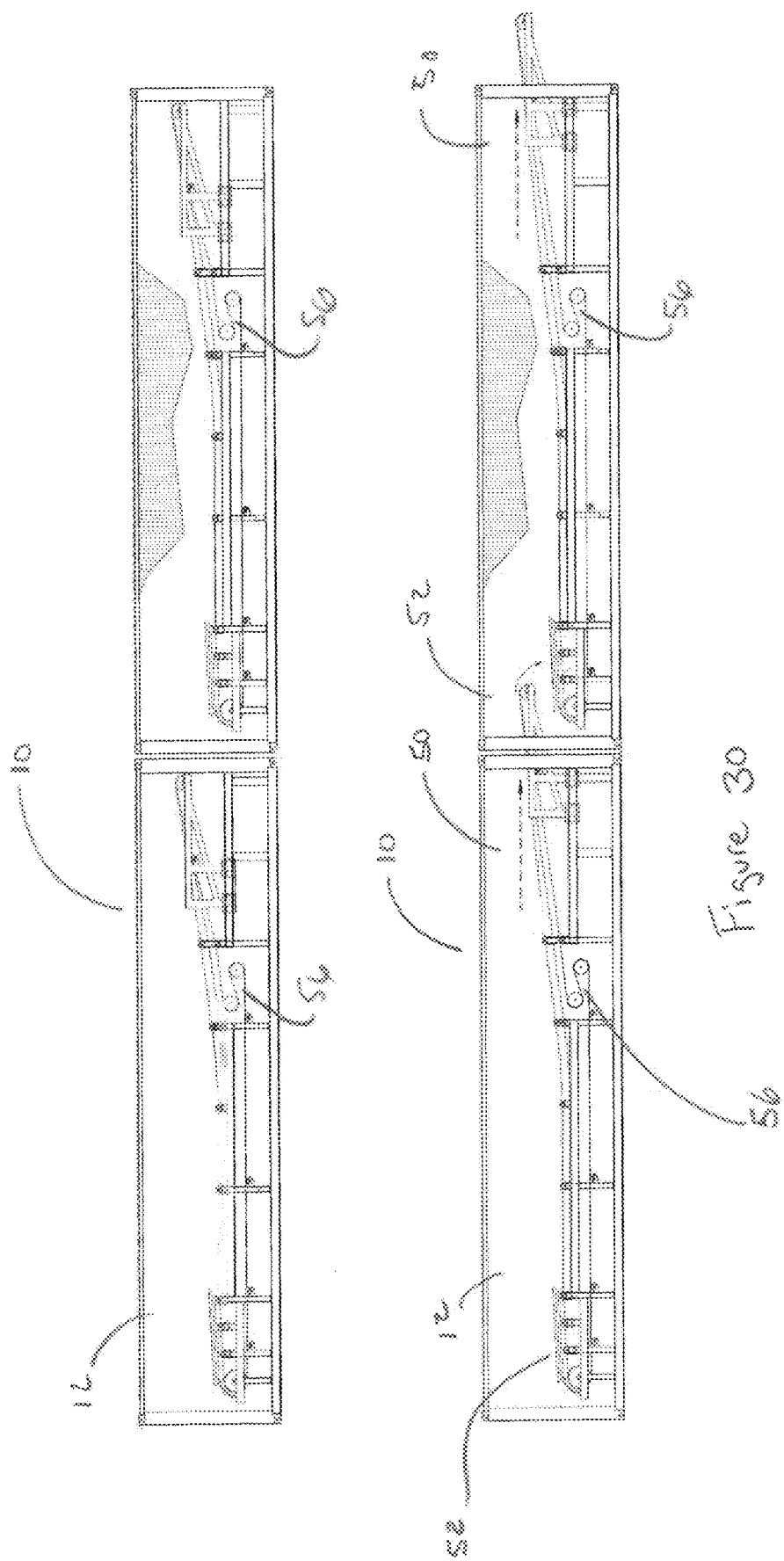
FIG. 30 shows a conveyance system that is fitted within a container in such a manner as to form a discreet conveyance within that single container, as outlined in FIG. 29.

FIG. 30 shows a conveyance system 10 that is fitted within a container 12 in such a manner as to form a discreet conveyance within that single container 12, as outlined in FIG. 29, and is adjoined in series to another such container 12 and conveyance combination, such that a multiple run of conveyances 10 is formed. As shown in FIG. 30, the load discharge 50 and load receiving 52 ends of the conveyance 10 are able to move along the container 12 to facilitate loading and unloading of the load being carried, and are able to protrude beyond the external dimensions of the container 12.

Figure 31:
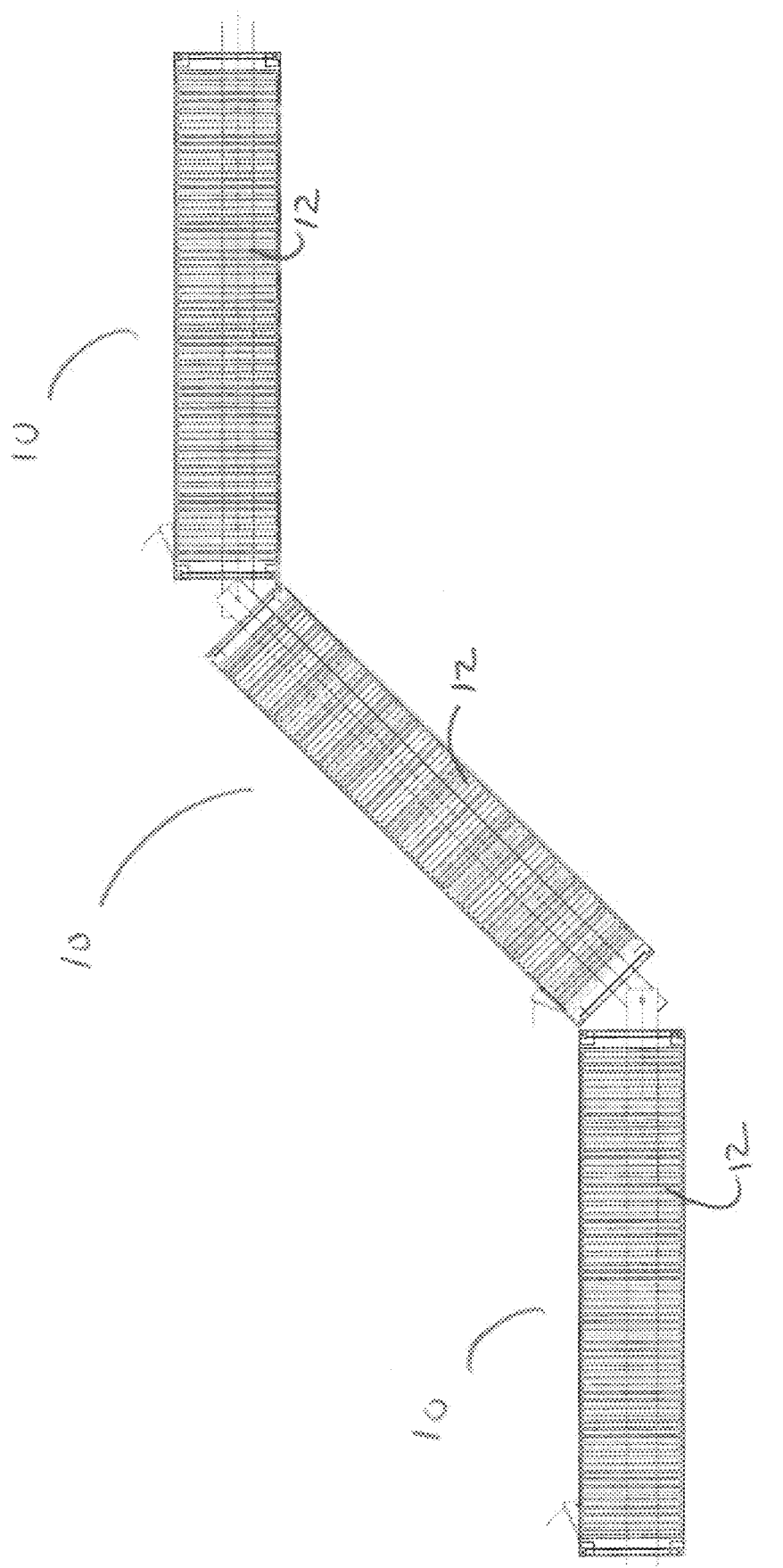
FIG. 31 shows multiple containers and conveyances, of the type outlined in FIGS. 29 and 30.

FIG. 31 shows multiple containers 12 and conveyances 10, of the type outlined in FIG. 29 and FIG. 30, arranged in a flexible manner such that corners, terrain or other desired installation arrangements can be employed. FIG. 31 also shows that the subsequent container 12 may be joined by an articulating joint allowing movement in any vertical, horizontal or about a longitudinal axis.

Figure 32:
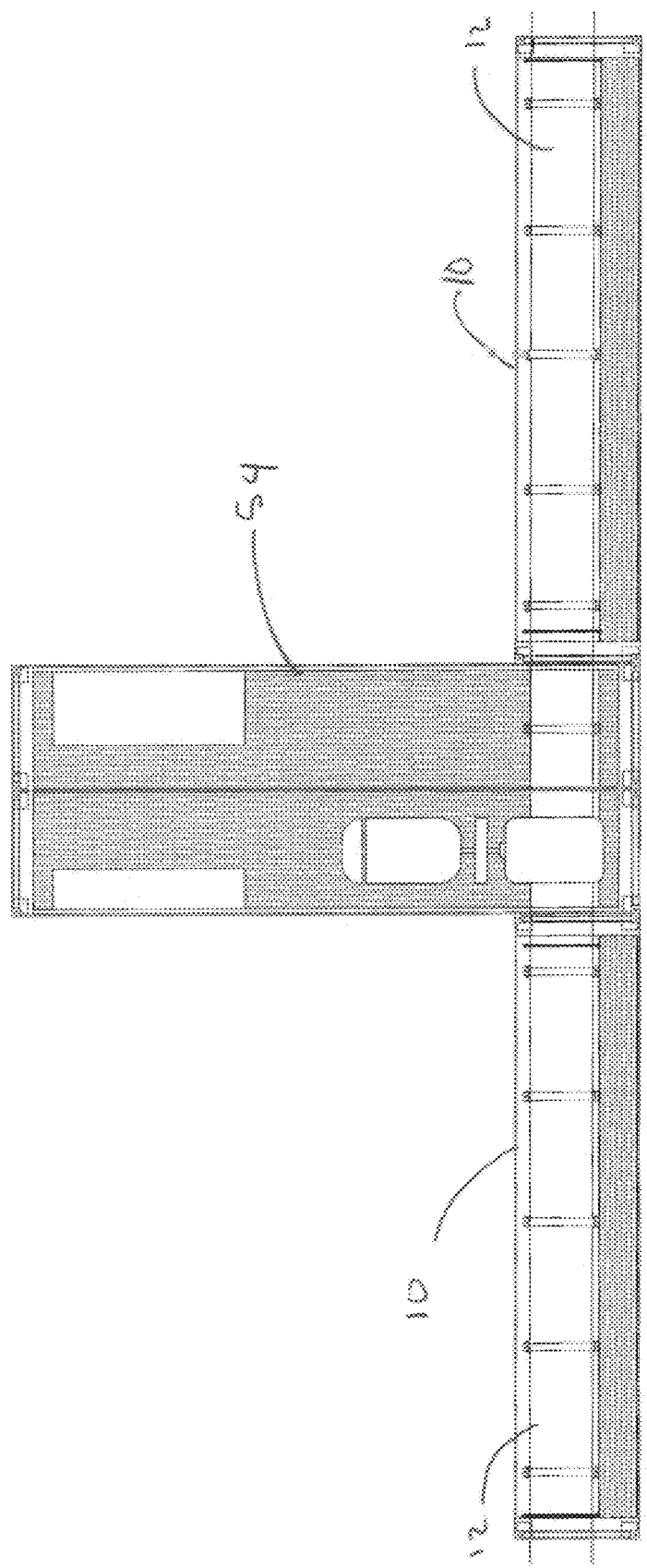
FIG. 32 shows the tractive drive module of a conveyance system.

FIG. 32 shows the tractive drive module 54 of a conveyance system 10 that is fitted within a container 12 in such a way to provide the necessary traction and motive force required to move the conveyance and load being carried. FIG. 32 also shows the necessary electrical controls and power management systems installed within the container 12.

Figure 33:
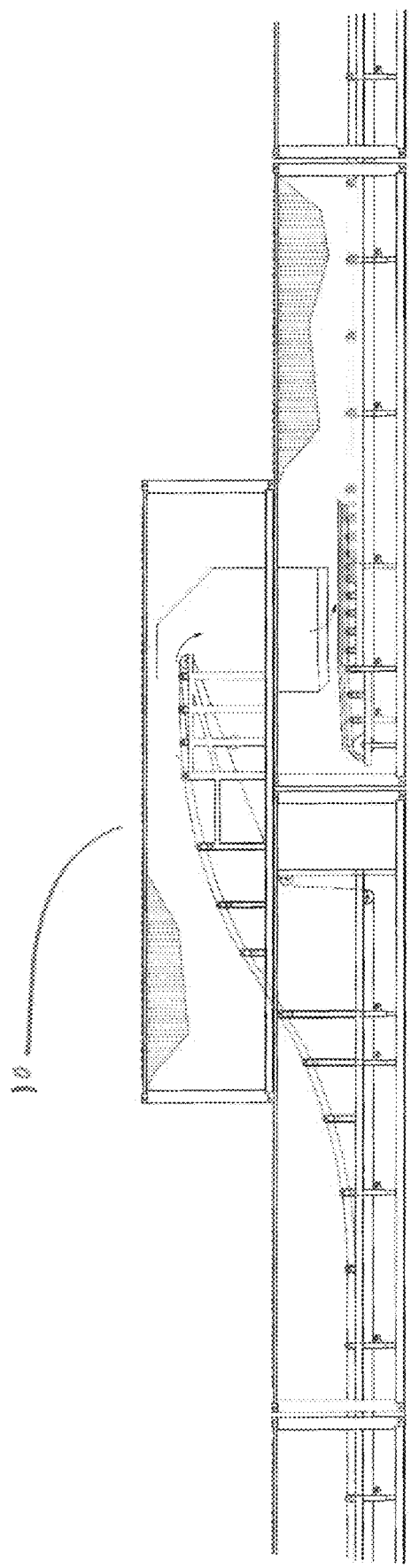
FIG. 33 shows a conveyance system whereby the load being transported by one conveyance is being transferred to another subsequent conveyance.

FIG. 33 shows a conveyance system 10 whereby the load being transported by one conveyance is being transferred to another subsequent conveyance.

Figure 34:
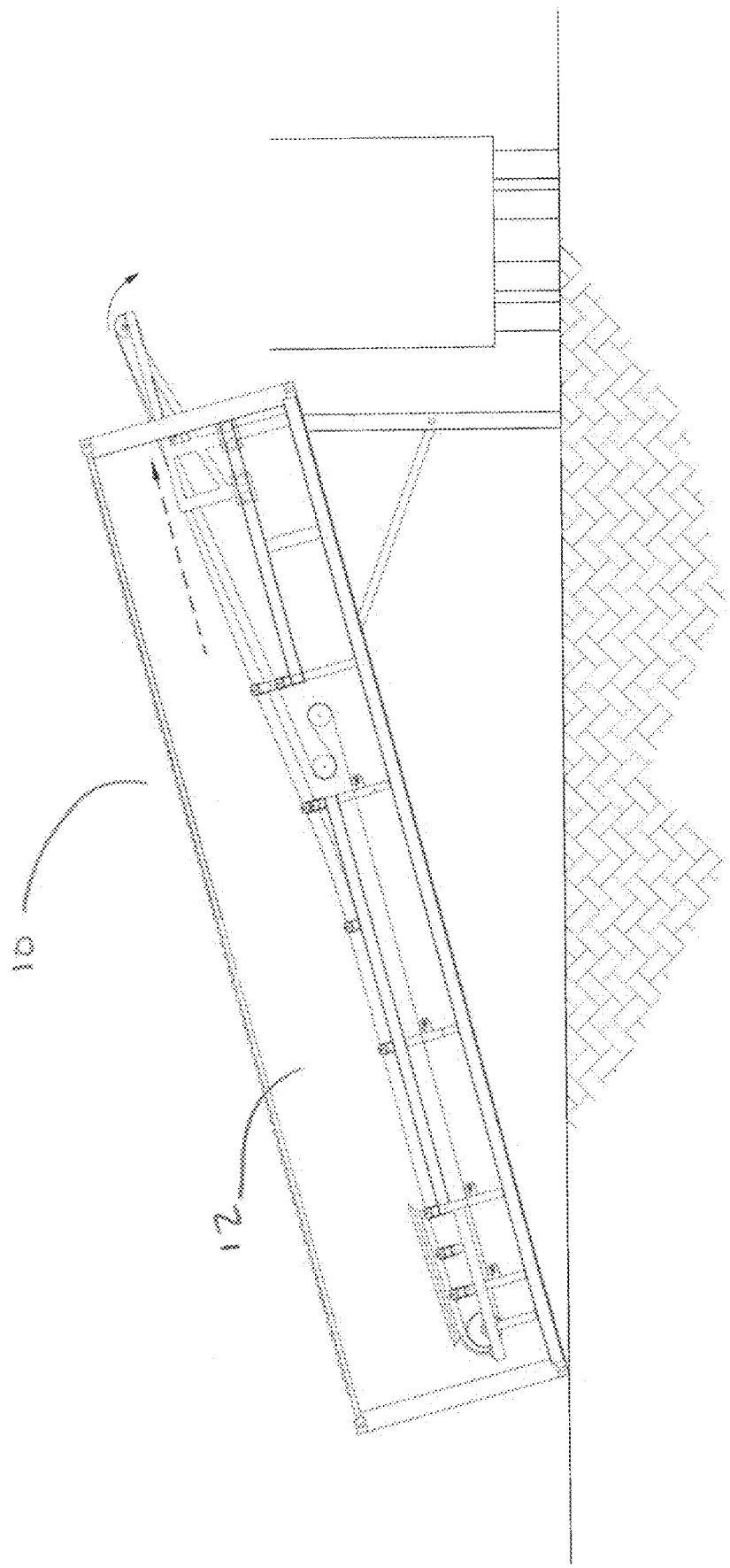
FIG. 34 shows a conveyance system that is installed in a container and supported in a manner that is other than the typical horizontal and parallel manner to the ground.

FIG. 34 shows a conveyance system 10 that is installed in container 12 and is supported in a manner that is other than the typical horizontal and parallel manner to the ground.

FIG. 35 shows a conveyance system 10 that is fitted within a container 12 and is able to be transported longitudinally along the length of the container run. In FIG. 35, the conveyance system 10 is being loaded through the roof 14 of the containers 12 that are able to be opened and closed with pivotable doors, and onto a mobile receiving trough.

Although the invention has been described with reference to a specific example, it will be appreciated by those skilled in the art that the invention may be embodied in other forms.

The invention claimed is:

1. A conveyance system including:
   a first conveyor having a frame connectable to a drive unit; and
   a shipping container having a base, a top wall, two opposing side walls and two opposing end walls, wherein:
   the first conveyor is fixed within the shipping container in an assembled state; and
   the shipping container is configured to connect to an adjacent shipping container to form a continuous conveyor.

2. The conveyance system of claim 1, wherein the end walls of the shipping container are removable.

3. The conveyance system of claim 1, further including an access panel for accessing the first conveyor.

4. The conveyance system of claim 3, wherein the access panel is movable within the side wall.

5. The conveyance system of claim 4, wherein the access panel is pivotably attached at the base and configured to open outwardly until parallel with the base to form a platform.

6. The conveyance system of claim 1, further including a platform within the shipping container.

7. The conveyance system of claim 1, wherein the shipping container is one of a standard 40 ft shipping container or a standard 20 ft shipping container.

8. The conveyance system of claim 1, wherein the shipping container includes the drive unit to form a discrete first conveyor having a load receiving point and a load discharge point.

9. The conveyance system of claim 1, further including solar panels on at least one of the walls of the container.

10. The conveyance system of claim 1, wherein the first conveyor is fixed to one of the side walls of the container for transport and the container is rotatable about a longitudinal axis for orientating the first conveyor in the assembled state.

11. The conveyance system of claim 1, wherein the shipping container is adapted to be mounted on a support structure selected from a group consisting of: a footing, a rail, a floatation device, or combination(s) thereof.

12. The conveyance system of claim 1, further including a second conveyor fixed within the shipping container.

13. The conveyance system of claim 1, further including a utility service line selected from the group consisting of: a compressed air line, a fresh water line, a fire water line, a waste-water line, a compressed air hose, a fresh water hose, a fire water hose, a waste-water hose, an electric line, a communication line, and combination(s) thereof.

14. The conveyance system of claim 1, wherein the shipping container has one of: a skid plate, an adjustable leg, or a combination thereof.

15. The conveyance system of claim 1, wherein:
the first conveyor comprises a load receiving portion and a load discharge portion; and
one of the load receiving portion, the load discharge portion, or a combination thereof is adapted to be moved from a first position to a second position when the continuous conveyor is assembled.

16. A conveyance system including:
a conveyor having a frame connectable to a drive unit; and
a shipping container having a base, a top wall, two opposing side walls and two opposing end walls, wherein:
the conveyor is fixed within the shipping container in an assembled state; and
the conveyor is fixed on one of the sidewalls of the container for transport, and is rotatable about the base to a horizontal position in the assembled state.

17. A conveyance system including:
a plurality of conveyor units, each conveyor unit comprising:
a shipping container, and
a conveyor fixed within the shipping container in an assembled state;
wherein each conveyor unit is configured to be coupled to an adjacent conveyor unit to form a continuous conveyor.

18. The conveyance system of claim 17, wherein a conveyor of a first conveyor unit is configured to transport a load in a first direction, and a conveyor of a second conveyor unit is configured to transport the load in a second direction when the second conveyor unit is coupled to the first conveyor unit.

19. The conveyance system of claim 18, wherein the first direction is different from the second direction.

20. The conveyance system of claim 19, further comprising a conduit configured to deflect the load from the first direction to the second direction.

* * * * *